US012693653B2

(12) United States Patent
EL-Qawasmeh et al.

(10) Patent No.: US 12,693,653 B2
(45) Date of Patent: Jul. 28, 2026

(54) MACHINE LEARNING BASED CYCLE TIME TRACKING AND REPORTING FOR VEHICLES

(71) Applicant: Rivian IP Holdings, LLC, Irvine, CA (US)

(72) Inventors: Omar EL-Qawasmeh, Bloomington, IL (US); Aditya Ajay Vaishampayan, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 389 days.

(21) Appl. No.: 18/406,750

(22) Filed: Jan. 8, 2024

(65) Prior Publication Data

US 2025/0224709 A1     Jul. 10, 2025

(51) Int. Cl.
    G05B 19/4155 (2006.01)
    G06T 7/00 (2017.01)
    (Continued)

(52) U.S. Cl.
    CPC ........ G05B 19/4155 (2013.01); G06T 7/0004 (2013.01); G06T 7/0008 (2013.01); (Continued)

(58) Field of Classification Search
    CPC ...... G05B 19/4155; G05B 2219/45135; G06T 7/0004; G06T 7/0008; G06T 7/73; G06T 11/00; G06T 2200/24; G06T 2207/10016; G06T 2207/30164; G06T 2207/30204; G06T 2207/30108; G06T 2207/30242; G06V 10/70; G06V 10/761; G06V 10/82; G06V 20/41; G06V 20/44; G06V 20/47; G06V 20/52; G06V 2201/06
    See application file for complete search history.

(56) References Cited

U.S. PATENT DOCUMENTS

| | | | |
|---|---|---|---|
| 10,202,135 B2 | 2/2019 | Mian et al. | |
| 10,380,767 B2 | 8/2019 | Barker et al. | |
| 11,158,177 B1 | 10/2021 | Elhattab et al. | |
| 11,851,034 B2 | 12/2023 | Davies et al. | |
| 11,975,630 B2 | 5/2024 | Balasubramanian et al. | |
| 12,361,100 B1 | 7/2025 | Petry et al. | |

(Continued)

OTHER PUBLICATIONS https://viso.ai/application/parking-lot-occupancy-detection/.

(Continued)

*Primary Examiner* — John Villecco
*Assistant Examiner* — Joshua B. Crockett
(74) *Attorney, Agent, or Firm* — Foley & Lardner LLP

(57)     ABSTRACT

Systems and methods for machine-learning based cycle time tracking and reporting for vehicles are provided. A system includes a processor coupled with memory. The system identifies one or more models trained with machine learning relating to physical characteristics of vehicles and location designations associated with vehicle areas. The system receives, from one or more cameras, a video stream that captures a vehicle disposed in a vehicle area comprising a location designation. The system determines, based on an analysis of a plurality of frames of the video stream and via the one or more models, a type of the vehicle disposed in the vehicle area and a duration the vehicle is disposed in the vehicle area. The system performs, based on the type of the vehicle and a comparison of the duration of the vehicle with a threshold, an action to cause delivery of the vehicle from the vehicle area.

20 Claims, 18 Drawing Sheets

(51) Int. Cl.

| | |
|---|---|
| *G06T 7/73* | (2017.01) |
| *G06T 11/00* | (2026.01) |
| *G06V 10/70* | (2022.01) |
| *G06V 10/74* | (2022.01) |
| *G06V 20/40* | (2022.01) |
| *G06V 20/52* | (2022.01) |
| *G06V 10/82* | (2022.01) |

(52) U.S. Cl.

CPC ............... *G06T 7/73* (2017.01); *G06T 11/00* (2013.01); *G06V 10/70* (2022.01); *G06V 10/761* (2022.01); *G06V 20/41* (2022.01); *G06V 20/44* (2022.01); *G06V 20/47* (2022.01); *G06V 20/52* (2022.01); *G05B 2219/45135* (2013.01); *G06T 2200/24* (2013.01); *G06T 2207/10016* (2013.01); *G06T 2207/30108* (2013.01); *G06T 2207/30164* (2013.01); *G06T 2207/30204* (2013.01); *G06T 2207/30242* (2013.01); *G06V 10/82* (2022.01); *G06V 2201/06* (2022.01)

(56) References Cited

U.S. PATENT DOCUMENTS

| | | | |
|---|---|---|---|
| 2005/0267657 A1 | 12/2005 | Devdhar | |
| 2014/0334684 A1 | 11/2014 | Strimling | |
| 2019/0362646 A1* | 11/2019 | Hsu | G09B 19/00 |
| 2021/0097302 A1 | 4/2021 | Butcher et al. | |
| 2021/0216809 A1 | 7/2021 | Kumar et al. | |
| 2021/0402523 A1* | 12/2021 | Ivkovich | G06N 20/00 |
| 2022/0171405 A1 | 6/2022 | Abe et al. | |
| 2023/0166361 A1 | 6/2023 | Yang et al. | |
| 2024/0135714 A1 | 4/2024 | Henderson et al. | |
| 2025/0376131 A1 | 12/2025 | Eva et al. | |

OTHER PUBLICATIONS

Non-Final Office Action on U.S. Appl. No. 18/406,733 dated Jan. 12, 2026 (9 pages).

Notice of Allowance on U.S. Appl. No. 18/406,764 dated Feb. 5, 2026 (7 pages).

* cited by examiner

600

700

1000

1100

1110

1105

1300

1405

MACHINE LEARNING BASED CYCLE TIME TRACKING AND REPORTING FOR VEHICLES

Vehicles can be manufactured in a manufacturing facility, such as in an assembly line. The assembly line can include various bays or stages where different aspects of the manufacturing process can be performed. However, due to the complex nature of manufacturing, and the various types of components being assembled in a vehicle, it can be challenging to efficiently manufacture a vehicle while maintaining quality control.

SUMMARY

Aspects of the technical solutions disclosed herein are generally directed to using machine learning to facilitate the manufacturing of vehicles, including, for example, i) providing machine learning-based cycle time tracking for vehicles with live, or real-time, reporting; ii) providing a machine learning-powered vision system to detect the state of parts being installed; or iii) machine-learning based cycle time analysis for a vehicle welding process. Due to technical and other challenges associated with limited hardware infrastructure or resources on a repair bay, it can be difficult to efficiently and reliably track or control the amount of time a vehicle spends in a repair bay at the end of a line where there is no conveyance mechanism. Aspects of the technical solutions disclosed herein can provide a system that can receive a video stream from one or more cameras and input the video stream into one or more machine learning models (or a multi-modal model) to detect whether a desired type of vehicle is present in the repair bay and to determine a duration that the vehicle is present in the repair bay while taking into account any obstacles.

To perform the operations described herein, the one or more models are trained using training data that includes images of repair bays with marking or lines. When the system detects a desired type of vehicle is located in the repair bay, the system can start a timer to determine the duration the vehicle is present in the repair bay. If the duration exceeds a cycle threshold, the system can provide an alert, flag, or other indication via a graphical user interface. The system can determine that an obstacle is blocking the camera from detecting the vehicle by using a buffer threshold where the system does not reset the timer if the vehicle is hidden or otherwise not detected in the repair bay.

At least one aspect is directed to a system. The system can include one or more processors, coupled with memory. The one or more processors can identify one or more models trained with machine learning relating to physical characteristics of vehicles and location designations associated with one or more vehicle areas. The one or more processors can receive, from one or more cameras, a video stream that captures a vehicle disposed in a vehicle area comprising a location designation. The one or more processors can determine, based on an analysis of a plurality of frames of the video stream with the one or more models, a type of the vehicle disposed in the vehicle area and a duration the vehicle is disposed in the vehicle area. The one or more processors can perform, based on the type of the vehicle and a comparison of the duration of the vehicle with a threshold, an action to cause delivery of the vehicle from the vehicle area.

At least one aspect is directed to a method. The method can be performed by one or more processors coupled with memory. The method can include the one or more processors identifying one or more models trained with machine learning relating to physical characteristics of vehicles and location designations associated with one or more vehicle areas. The method can include the one or more processors receiving, from one or more cameras, a video stream that captures a vehicle disposed in a vehicle area comprising a location designation. The method can include the one or more processors determining, based on an analysis of a plurality of frames of the video stream with the one or more models, a type of the vehicle disposed in the vehicle area and a duration the vehicle is disposed in the vehicle area. The method can include the one or more processors performing, based on the type of the vehicle and a comparison of the duration of the vehicle with a threshold, an action to cause delivery of the vehicle from the vehicle area.

At least one aspect is directed to a non-transitory computer-readable medium storing processor executable instructions. When executed by one or more processors, the processor executable instructions can cause the one or more processors to identify one or more models trained with machine learning relating to physical characteristics of vehicles and location designations associated with one or more vehicle areas. The processor executable instructions can cause the one or more processors to receive, from one or more cameras, a video stream that captures a vehicle disposed in a vehicle area comprising a location designation. The processor executable instructions can cause the one or more processors to determine, based on an analysis of a plurality of frames of the video stream with the one or more models, a type of the vehicle disposed in the vehicle area and a duration the vehicle is disposed in the vehicle area. The processor executable instructions can cause the one or more processors to perform, based on the type of the vehicle and a comparison of the duration of the vehicle with a threshold, an action to cause delivery of the vehicle from the vehicle area.

An aspect can be directed to a system. The system can include one or more processors coupled with memory. The one or more processors can receive, from one or more cameras, a video stream that captures a component for a vehicle, the component disposed in a predetermined area. The one or more processors can determine, via one or more models trained with machine learning and based on the video stream, a type of the component. The one or more processors can detect, responsive to the type of the component matching a predetermined type and an analysis of a plurality of frames of the video stream with the one or more models, a welding arc and a duration the component is disposed in the predetermined area subsequent to detection of the welding arc. The one or more processors can perform, based on the duration, an action to control a welding process for the component of the vehicle.

An aspect can be directed to a method. The method can be performed by one or more processors coupled with memory. The method can include the one or more processors receiving, from one or more cameras, a video stream that captures a component for a vehicle, the component disposed in a predetermined area. The method can include the one or more processors determining, via one or more models trained with machine learning and based on the video stream, a type of the component. The method can include the one or more processors detecting, responsive to the type of the component matching a predetermined type and an analysis of a plurality of frames of the video stream with the one or more models, a welding arc and a duration the component is disposed in the predetermined area subsequent to detection of the welding arc. The method can include the one or more processors performing, based on the duration, an action to control a welding process for the component of the vehicle.

An aspect can be directed to a vehicle manufacturing system. The vehicle manufacturing system can include markings surrounding a welding area in a manufacturing facility. The vehicle manufacturing system can include a camera oriented to capture image data from the welding area. The vehicle manufacturing system can include one or more processors coupled with memory. The one or more processors can receive, from the camera, a video stream that captures a component for a vehicle, the component disposed in the welding area. The one or more processors can determine, via one or more models trained with machine learning and based on the video stream, a type of the component. The one or more processors can detect, responsive to the type of the component matching a predetermined type and an analysis of a plurality of frames of the video stream with the one or more models, a welding arc and a duration the component is disposed in the predetermined area subsequent to detection of the welding arc. The one or more processors can perform, based on the duration, an action to control a welding process for the component of the vehicle.

An aspect can be directed to a system. The system can include one or more processors coupled with memory. The one or more processors can receive, from a camera, image data that captures at least a portion of a vehicle. The one or more processors can identify, via one or more models trained with machine learning and based on the image data, a type of a component at least partially assembled on the at least the portion of the vehicle. The one or more processors can select, based on the type of the component, a reference image indicative of an assembly of the type of the component and a tolerance threshold for the assembly. The one or more processors can determine a value for a metric based on a comparison of the reference image with the image data comprising the component that is at least partially assembled on the vehicle. The one or more processors can perform, based on a comparison of the value for the metric with the tolerance threshold, an action to control a manufacturing operation of the vehicle.

An aspect can be directed to a method. The method can be performed by one or more processors coupled with memory. The method can include the one or more processors receiving, from a camera, image data that captures at least a portion of a vehicle. The method can include the one or more processors identifying, via one or more models trained with machine learning and based on the image data, a type of a component at least partially assembled on the at least the portion of the vehicle. The method can include the one or more processors selecting, based on the type of the component, a reference image indicative of an assembly of the type of the component and a tolerance threshold for the assembly. The method can include the one or more processors determining a value for a metric based on a comparison of the reference image with the image data comprising the component that is at least partially assembled on the vehicle. The method can include the one or more processors performing, based on a comparison of the value for the metric with the tolerance threshold, an action to control a manufacturing operation of the vehicle.

An aspect can be directed to a vehicle manufacturing system. The vehicle manufacturing system can include a machine learning-powered vision system with a camera. The vehicle manufacturing system can include a battery electrically coupled with the camera to deliver power to the camera. The vehicle manufacturing system can include one or more processors coupled with memory. The one or more processors can receive, from the camera, image data that captures at least a portion of a vehicle. The one or more processors can identify, via one or more models trained with machine learning and based on the image data, a type of a component at least partially assembled on the at least the portion of the vehicle. The one or more processors can select, based on the type of the component, a reference image indicative of an assembly of the type of the component and a tolerance threshold for the assembly. The one or more processors can determine a value for a metric based on a comparison of the reference image with the image data comprising the component that is at least partially assembled on the vehicle. The one or more processors can perform, based on a comparison of the value for the metric with the tolerance threshold, an action to control a manufacturing operation of the vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
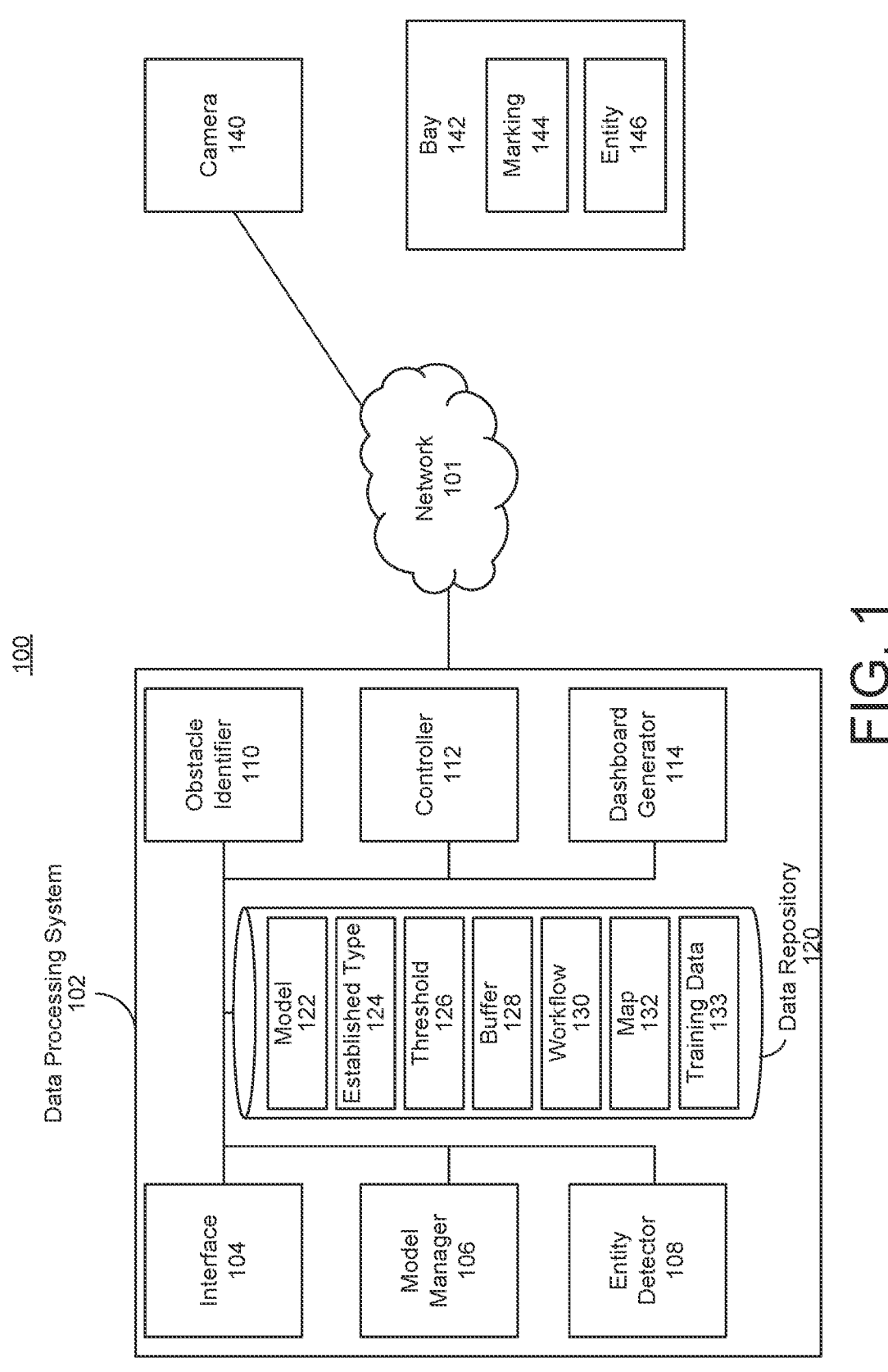
FIG. 1 depicts an example system of machine learning based cycle time tracking and reporting for vehicles.

Following below are more detailed descriptions of various concepts related to, and implementations of, methods, apparatuses, and systems of machine learning based manufacturing of vehicles. The various concepts introduced above and discussed in greater detail below can be implemented in any of numerous ways.

Aspects of the technical solutions disclosed herein are generally directed to using machine learning to facilitate the manufacturing of vehicles, including, for example, i) providing machine learning-based cycle time tracking for vehicles with live, or real-time, reporting; ii) providing a machine-learning vision-based system to detect the state of parts being installed; or iii) machine-learning based cycle time analysis for a vehicle welding process. Due to technical and other challenges associated with limited hardware infrastructure or resources on a repair bay, it can be difficult to efficiently and reliably track or control the amount of time a vehicle spends in a repair bay at the end of a line where there is no conveyance mechanism. This technical solution provides a system that can receive a video stream from one or more cameras and input the video stream into one or more machine learning models (or a multi-modal model) to perform more accurate detection of whether a desired type of vehicle is present in the repair bay. The system can identify different types of vehicles and differentiate the vehicles from other objects which may be within the repair bay, such as persons, equipment, or furniture. Furthermore, the system can accurately determine a duration that the vehicle is present in the repair bay while taking into account any obstacles that may pass between the camera and the vehicle that hide the vehicle. For example, the system can determine the duration that the vehicle is in the repair bay even if obstructions block the camera for a period of time by implementing a buffer based on the frame rate of the camera.

To perform the operations described herein, the one or more models are trained using training data that includes images of repair bays with marking or lines. The models can also be trained based on physical characteristics of vehicles such that the model can detect whether a desired type of vehicle is present in the repair bay. The physical characteristics of the vehicle can refer to or include external or exterior physical characteristics, such as a shape of the vehicle. When the system detects a desired type of vehicle is located in the repair bay, the system can start a timer to determine the duration the vehicle is present in the repair bay. If the duration exceeds a cycle threshold, the system can provide an alert, flag, or other indication via a graphical user interface. The system can determine that an obstacle is blocking the camera from detecting the vehicle by using a buffer threshold (e.g., 30 seconds, 1 minute, 2 minutes, etc.) where the system does not reset the timer if the vehicle is hidden or otherwise not detected in the repair bay.

Thus, this technical solution can accurately detect a type of vehicle and the duration that the vehicle is in the repair bay without erroneously being impacted by obstacles or objects such as irrelevant vehicles (e.g., a golf cart). The system can further provide a dashboard that graphically tracks the cycle time of vehicles in the repair bay and reports a status of the vehicle in real-time to provide for a more accurate representation of vehicle cycle times and more efficient processing of vehicles within repair bays.

FIG. 1 depicts an example system 100 of machine learning-based cycle time tracking for vehicles with live reporting. The system 100 can include one or more processors, coupled with memory. The system 100 can include, interface, access or otherwise communicate with a server system. The system 100 can include a data processing system 102. The data processing system 102 can be or can include the server system, which may include software modules allowing various computing devices to access or manipulate data stored by the data processing system 105. The data processing system 102 can be referred to as, or include, a computing system or computer system (e.g., one or more component of computer system 1800 depicted in FIG. 18). One or more component or functionality of the data processing system 102 can be hosted on, or performed by, the server system. The system 100 can include one or more cameras 140. The data processing system 102 can communicate or interface with one or more cameras 140 via a network 101. The network 101 can transfer or transmit data between the data processing system 102 and the cameras 140. The network 101 can include any kind of communications link, cables, transmitters, receivers, transceiver, logic circuit, communication chip, communication network (e.g. a local area network ("LAN"), a wide area network ("WAN"), or an internetwork (the internet) cellular network (e.g., 3G, 4G, or 5G)), configured to allow or facilitate communication, transmission, reception, or connection with the components of the system and with outside systems. The network 101 can be a private network or a public network. The system 100 can include one or more vehicle areas. The vehicle areas can include one or more bays 142. The vehicle areas or bays 142 can include one or more markings 144 and one or more entities 146.

The cameras 140 can capture video streams and pictures. The cameras 140 can be positioned to capture vehicle areas (e.g., bays 142) that include markings 144 and entities 146. The cameras 140 can provide visual data for the data processing system 102 and for real-time processing and analysis. The cameras 140 can track the duration of vehicle presence within the bays 142 and the activities associated with the entities 146 present. The cameras 140 can include one or more of closed-circuit television (CCTV) cameras, infrared (IR) cameras, thermal imaging cameras, pan-tilt-zoom (PTZ) cameras, high-definition (HD) cameras, and 360-degree cameras. The cameras 140 can provide visual data during low-light conditions by detecting infrared radiation emitted by an object or entity 146. The cameras 140 can detect heat signatures of different entities 146. The cameras 140 can provide visual data at different wavelengths of light.

The entities 146 can include vehicles, components of vehicles, components used in manufacturing operations, welding arcs, and personnel such as inspectors, welders, and operators. The vehicles can be of different types, sizes, and shapes. The vehicles include sedans, coupes, hatchbacks, vans, trucks, forklifts and motorcycles. The components of vehicles can be parts that are used in assembly in a manufacturing plant or repair shop. The components of vehicles can include engines, transmissions, seats, chassis, and body panels. The components used in manufacturing operations can include tools, machinery, robotic arms, conveyor belts, and welding equipment. The inspectors, welders, and operators can wear distinguishing uniforms, jackets, and helmets. The uniforms, jackets, and helmets can have visible QR codes or barcodes.

The bay 142 can be a designated area within a larger space such as a manufacturing floor, a warehouse, a parking lot, or any other vehicle-handling facility. The bay 142 can be marked or delineated to define a specific location where a vehicle can be placed. The bay 142 can be used to organize a workflow in a vehicle-related facility and to manage a space efficiently. The bay 142 can include markings 144 within or around the bay 142 to serve as visual or detectable indicators. The markings 144 (or other types of location designations) can be painted lines, shapes, or symbols on the floor; barcodes or QR codes; RFID tags; or any kind of signage that provides information about the bay 142. The bays 142 or markings 144 can be in a predetermined area.

The data processing system 102 can include an interface 104, a model manager 106, an entity detector 108, an obstacle identifier 110, a controller 112, a dashboard generator 114, and a data repository 120. The data repository 120 can include a model 122, an established type 124, a threshold 126, a buffer 128, a workflow 130, a map 132, and training data 133. The data repository 120 can be any memory, storage, or cache for storing information or data structures that facilitates the data processing system 102 to perform machine learning-based cycle time tracking for vehicles with live reporting. The data repository 120 can contain any information about the system 100 and can allow that information to be accessed by any components of the data processing system. Information in the data repository 120 can be stored in any kind of memory, such as a cloud or hard drive. The data repository 120 can include, for example, random access memory (RAM), dynamic random access memory (DRAM), static random access memory (SRAM), error-correcting code (ECC), read only memory (ROM), programmable read only memory (PROM), or electrically erasable read only memory (EEPROM). The data repository 120 can be accessed at any time and by any component of system 100. Each element of the data processing system 102 can interface with, communicate with, or otherwise utilize other elements of the data processing system 102.

The data processing system 102 can include an interface 104 designed, constructed and operational to communicate via network 101. The system 100 can include, interface with, communicate with, or otherwise utilize the interface 104. The interface 104 can provide a user interface. For example, the interface 104 can include or provide a graphical user interface, such as the graphical user interfaces 200, 300, 400, and 500 depicted in FIG. 2, FIG. 3, FIG. 4, and FIG. 5, respectively. The interface 104 can be the point of interaction between the system 100 and its users. The interface 104 can present to the users the information processed from the cameras 140 by the data processing system 102. The interface 104 can provide, for display via a graphical user interface, an indication of the entities 146 present in the bay 142, the duration that the entities 146 have been present (e.g. timer or a timestamp indicating the time of entry), and the status of the entities 146. The interface 104 can provide, for display via a graphical user interface, an indication of the count of welding arcs overlaid on a display of a video stream. The interface 104 can provide, for display via a graphical user interface, an indication of the count of welders overlaid on a display of the video stream The status of the entities 146 can indicate whether the entity 146 is currently present in the bay or not (e.g., "present", "not present", "empty", "partially loaded", "fully loaded"), the operational state of the entity 146 (e.g., "idle", "loading", "unloading", "in maintenance", "moving", "parked"), information about whether the entity is in a secure state or if there are any security concerns (e.g., "hazard detected", "in compliance", "violation detected"), scheduling status (e.g., if the entity 146 is on schedule, early, or late), or priority status. The interface can display an indication of the count of welding arcs or welders shown in the cameras 140.

The system 100 can include, interface with, communicate with, or otherwise utilize the model 122. The models 122 can understand, interpret, and generate output from multiple types of data input from the cameras 140. The data inputs can be multi-modal and can include text (e.g., .txt, .csv, .json, .xml), images (e.g., .jpg, .jpeg, .png, .bmp, .gif), audio (e.g., .mp3, .wav, .aac, .flac), and video (e.g., .mp4, .avi, .mov, .wmv). The models 122 can process and integrate data from different data sources (e.g., different cameras or different types of cameras). The models 122 can be machine learning models. The models 122 can be, but are not limited to, convolutional neural networks (CNN), you only look once (YOLO) algorithm, region-based CNN, or single-shot detector (SSD). The models 122 output can include maps 132 of the bays 142. The maps 132 can provide a layout of the bays 142, including the locations of individual bays 142, entry and exit points, and infrastructure like roads, pathways, loading docks, and storage areas.

The models 122 can detect the presence of the entity 146 by processing a sequence of frames captured over time. The models 122 can detect the duration of the entity 146 by processing a sequence of frames captured over time. The models 122 can use one or more of these frames to identify entity 146 positioned in the vehicle area at a first time stamp. The initial detection is crucial as it establishes the starting point for calculating the duration of the entity's 146 stay within the bay 142. The models 122 can utilize a subsequent set of frames to identify the moment entity 146 leaves the bay 142, marking a second time stamp. By inputting frames into the models 122, the data processing system 102 can detect the absence of the entity 146 in the vehicle area. The GUI 200 then calculates the duration of the entity's 146 presence by computing the difference between the second time stamp and the first. This calculated duration can be displayed to the users through the interface 104, allowing for real-time monitoring and management of entity 146 flow and bay 142 occupancy.

The system 100 can include, interface with, communicate with, or otherwise utilize the model manager 106. The model manager 106 can be responsible for overseeing and selecting the models 122 that the system 100 uses to interpret data from the cameras 140. The model manager 106 can handle tasks such as model training, selection, deployment, updates, and performance monitoring. The model manager 106 can ensure that the most accurate models 122 are used for data analysis. The model manager 106 can train the model 122 based on training data 133. The training data 133 can include pre-labeled data. The pre-labeled data can include images where each entity 146 of interest (e.g., different types of vehicles, components of vehicles, components used in manufacturing, inspectors, welders, and operator, etc.) is already identified and labeled. The models 122 can learn to recognize and classify different entities 146 based on the labels during training. The pre-labeled data can include video streams that provide temporal. The model training processes can involve exposing the models 122 to a range of scenarios captured in the images and videos, such as different vehicle types, lighting conditions, angles of camera placement, and various activities occurring within the bays 142. The training data 133 can include noise and technical imperfections in the camera 140. As the system 100 captures more real-world data from the cameras 140, the model manager 106 can use the new data to further train and refine the models 122. For example, the model manager 106 can train the models 122 to learn different physical characteristics of vehicles shapes of vehicles or different markings 144. The physical characteristics of the vehicle can refer to or include external or exterior physical characteristics, including, for example, the shape of the vehicle, types of objects or components on the vehicle, size and dimension of the vehicle, body type of the vehicle (e.g., sedan, coupe, sport utility vehicle, truck, convertible), wheelbase, grille, headlights and taillights (e.g., shapes, sizes, technologies, or configuration), mirrors, roof type (e.g., hardtop, soft-top, or panoramic), body lines and contours, or other features. The markings 144 can refer to or include location designations associated with one or more vehicle areas. The location designations (or markings 144) can include light projections that can show or otherwise illustrate or indicate designated areas or a facility that can corresponds to a vehicle area or repair area. The area indicated by the markings 144 (or other location designation) can correspond to an area that can be fully automated such that the data processing system 102 is configured to be aware of the preset or designated area, whereas other systems or personnel may not be aware. The location designations (e.g., markings 144) can be physical markings, light-based or projection based markings, electronic markings, or use various other geo-fence or electronic-based marking technologies.

The model manager 106 can train the models 122 to learn historical image data of welding arcs emitted during historic welding processes under varied lighting conditions and manufacturing environments. The training data 133 can include reference images of vehicle components. The training data 133 can include reference images of vehicle components partially or fully assembled on the vehicles. The training data 133 can include historical image data of entities and vehicle components in varied lighting conditions and manufacturing environments.

The models 122 can calculate, for an image, a value for a metric based on a comparison of a reference image with the image data. The image can be an image of a vehicle component that is fully or partially assembled. The metric can be, but is not limited to, a cross-correlation score, Euclidean distance for pixel values in two images, a sum of the differences between corresponding pixels in the two images, and a structural similarity index (SSI). The model manager 106 can select a reference image indicative of an assembly of a vehicle component, from the data repository 120 or training data 133. The model manager 106 can select the reference image based on a type of the vehicle. The model manager 106 can select the tolerance threshold for a reference image based on the type of the vehicle. The model manager 106 can select, based on the type of a second entity 146 or vehicle component, a second reference image indicative of assembly of the second type of the second component and a second tolerance threshold for the assembly.

The system 100 can include, interface with, communicate with, or otherwise utilize the entity detector 108. The entity detector 108 can include one or more components or functionality of the model 122. The entity detector 108 can include a specialized machine learning model or a set of algorithms that analyze the video streams to identify and classify different entities 146 within the bays 142, such as vehicles, personnel, or equipment. The entity detector 108 can determine, based on an analysis of a plurality of frames of the video stream with one or more models, a type of the vehicle disposed in the vehicle area and a duration the vehicle is disposed in the vehicle area. For example, the entity detector 108 can input the plurality of frames of the video stream into the one or more models to generate an output that indicates a type of the vehicle disposed in the vehicle area and a duration the vehicle is disposed in the vehicle area. The entity detector 108 can perform an analysis of the plurality of frames using the one or more models in order to make the determination. The entity detector 108 can determine the quantity and type of vehicles, personnel, and equipment present in an image. The entity detector 108 can determine the absence of vehicles, personnel, and equipment in an image or video stream.

The system 100 can include, interface with, communicate with, or otherwise utilize the obstacle identifier 110. The obstacle identifier 110 can include one or more components or functionality of the model 122. The obstacle identifier 110 can use the camera feeds to detect any obstacles within the bays 142 that might obstruct operations or the camera's view. The obstacles can include, but are not limited to, unexpected items or objects, such as chairs, ladders, tables, a golf cart, unidentified tools, or debris. The obstacle identifier 110 can include machine learning models that differentiate between normal operational conditions of the bays 142 and the presence of obstacles.

The system 100 can include, interface with, communicate with, or otherwise utilize the controller 112. The controller 112 can execute actions and make real-time decisions based on the data from the model manager 106, entity detector 108, and obstacle identifier 110. The controller 112 can be programmed with algorithms that enable it to determine when to initiate responses, such as issuing alerts, triggering alarms, or activating mechanisms to control the delivery and movement of vehicles within the bays based on predefined criteria, such as the type of vehicle identified or the duration of its stay exceeding thresholds 126. For example, if a vehicle has overstayed in a bay, the controller 112 can calculate the appropriate response, such as to notify personnel, update the status on a dashboard via the dashboard generator 114, or directly interface with automated systems that manage vehicle logistics. A workflow 130 can be a representation of the sequence of operations or steps involved in processing vehicles in the bay 142. The workflow 130 can be different for different bays 142 (e.g., manufacturing floor, a warehouse, a parking lot, or any other vehicle-handling facility). The workflow 130 can include stages like entry, parking, loading/unloading, assembly, manufacturing, maintenance, and exit procedures. The controller 112 can determine, based on an identifier associated with the vehicle area or the type of the vehicle, the status of the workflow 130 for the vehicle. For example, the controller 112 can track vehicles moving through different stages of inspection or quality control, and trigger alerts if a vehicle fails to pass a certain stage or spends too long in one area. The controller 112 can trigger alerts to allocate resources such as personnel or equipment based on the vehicle's type and current stage in the workflow 130 (e.g., the controller 130 summon a forklift to a loading bay when a truck carrying cargo arrives). If a hazardous material transport vehicle is detected in the bay 142, the controller 112 can initiate emergency protocols, such as evacuating the area or notifying emergency response teams.

The controller 112 can monitor the duration of various events or entities 146 presence within the system 100 (e.g., how long a vehicle has been parked in the bay 142). When the duration reaches or exceeds a threshold 126, the controller 112 can trigger an alarm (e.g., visual alarm or audio alarm). The controller 112 can include a buffer 128. The buffer 128 can also be referred to as buffer threshold 128. The buffer threshold 128 can include an additional level of threshold before the main threshold 126 is reached. For example, if the threshold 126 for a vehicle's stay in a bay is 60 minutes, the buffer threshold 128 can be set at 50 minutes to allow for preemptive action or readiness before the situation becomes critical. If a vehicle's stay duration meets or exceeds the threshold 126, the controller 112 can initiate a predefined action to control the delivery of the vehicle from the vehicle area. For example, the action can be to issue an alert to the driver or to the facility's management team to remove the vehicle. The controller 112 can perform, based on the duration, an action to control a welding process for the component of the vehicle or entity 146. The controller 112 can trigger an action to control the welding process for the component of the vehicles or entities 146. The action or actions triggered by the controller 112 can depend on the quality of a process, equipment, product, or entity 146 determined by the models 122.

The threshold 126 can be a distance threshold. The models 122 can identify a count of welding arcs located within the threshold 126 of a component or the entity 146. For example, an action by the controller 112 can be triggered if the count of welding arcs located within a distance of the component exceeds a threshold 126. The models 122 can identify a count of welders located within a threshold 126 of a component or the entity 146. The models 122 can be programmed to detect and count the number of welding arcs that occur within a certain proximity to a component or entity 146. This function is not limited to mere enumeration; it is deeply integrated with the operational workflow 130. Should the quantity of welding arcs within the specified distance exceed the set threshold 126, the controller 112 can be triggered to take appropriate action, to ensure that welding activity remains within acceptable limits. Welding activity can include the presence of welding arcs, welders, or operation of welding arcs.

The models 122 can identify an inspector located within a threshold 126 of a location of the welding arc. The model 122 can calculate the duration-referred to as the second duration-during which the inspector remains within the threshold 126. The duration can serve as a proxy for assessing the quality of the welding or inspection process. The longer an inspector is present at the bay 142, the more detailed the quality assessment can be. Consequently, based on the determined quality inferred from the second duration, a selection can be made regarding the action required to control or adjust the inspection process. The models 122, through inputted images from the cameras 140, can determine the quality of the welding process based on the second duration. The controller 112 can select the action to control the welding process based on the quality. The models 122 can generate a value, to be displayed by the interface 104, of a performance metric for the welding process based on the duration. The controller 112 can select the action to perform to improve the value of the performance metric.

The system 100 can include, interface with, communicate with, or otherwise utilize the dashboard generator 114. The dashboard generator 114 can create visual representations of the output data for display on the graphical user interface. The dashboard generator 114 can create a visual representation of the map 132. The maps 132 can be digital. The maps 132 can include an indication of the vehicles present or absent in the bay 142. The maps 132 can include heatmaps that display heat information of the entities 146. For example, the heatmaps can provide an indication of the amount of welding performed at a location in the bay 142. The maps 132 can display high activity areas within the bay 142. The dashboard generator 114 can provide historical data trends and can include past traffic patterns, common bottlenecks, or changes in activity levels over time.

Figure 2:
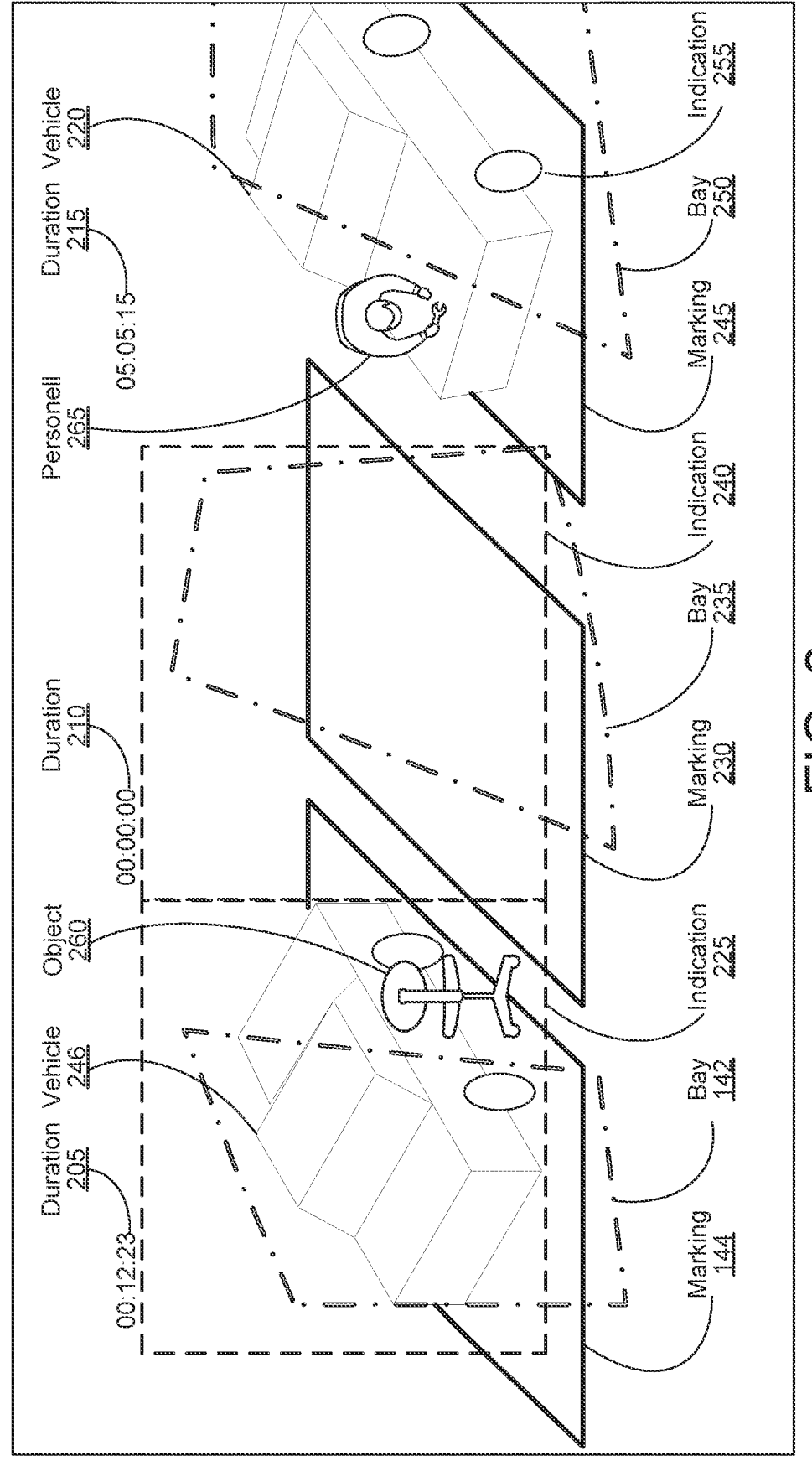
FIG. 2 depicts an example graphical user interface of vehicles in a bay.

FIG. 2 depicts an example graphical user interface (GUI) 200 of vehicles in a bay. The graphical user interface 200 can be provided by the data processing system 102 (e.g., via interface 104). The marking 144 can be a spot within the bay 142 where a vehicle 246 is parked or serviced. The graphical user interface 200 can detect the presence of the vehicle 246 and of an object 260. The graphical user interface 200 can display the duration 205 that the vehicle 246 has been in the bay 142. The duration 205 can be the idle duration that the vehicle 246 has been stationary and not in active use in the bay 142. The graphical user interface 200 can display a message if the duration 205 exceeds a certain threshold. An indication 225 can be a visual alert or status indicator related to vehicle 246 or bay 142. The indication 225 can include a color-coded frame, signals, icons, or text messages conveying information such as service completion, pending actions, or alerts. The graphical user interface 200 can detect and display information about the object 260 (e.g. chair) in bay 142. A duration 210 can be displayed as zero when a marking 230 or bay 235 is empty. An indication 240 can indicate a color-coded frame, signals, icons, or text messages that state that the marking 230 or bay 235 is empty. The indication can be an invisible boundary box.

The graphical user interface 200 can detect and display information about a vehicle 220 or entity in a bay 250 or marking 245. The graphical user interface 200 can detect that entity is a personnel 265. The graphical user interface 200 can detect the identity of the personnel 265 based on the distinguishing uniforms, jackets, and helmets of the personnel 265 (e.g., color of apparel or visible QR codes or barcodes). The graphical user interface 200 can display a duration 215 the vehicle 220 has spent in bay 250 or marking 245 for maintenance purposes. For example, if the personnel 265 is an inspector, the duration 215 can represent the time of inspection. If the personnel 265 is a welder, the duration 215 can represent the time of welding. If the personnel 265 is an operator, the duration 215 can represent the maintenance time. The graphical user interface 200 can visually communicate if the duration 215 has surpassed a threshold. An indication 255 can change to a specific color to signify if the duration 215 has exceeded a threshold for vehicle 220, thereby prompting necessary actions or attention.

Figure 3:
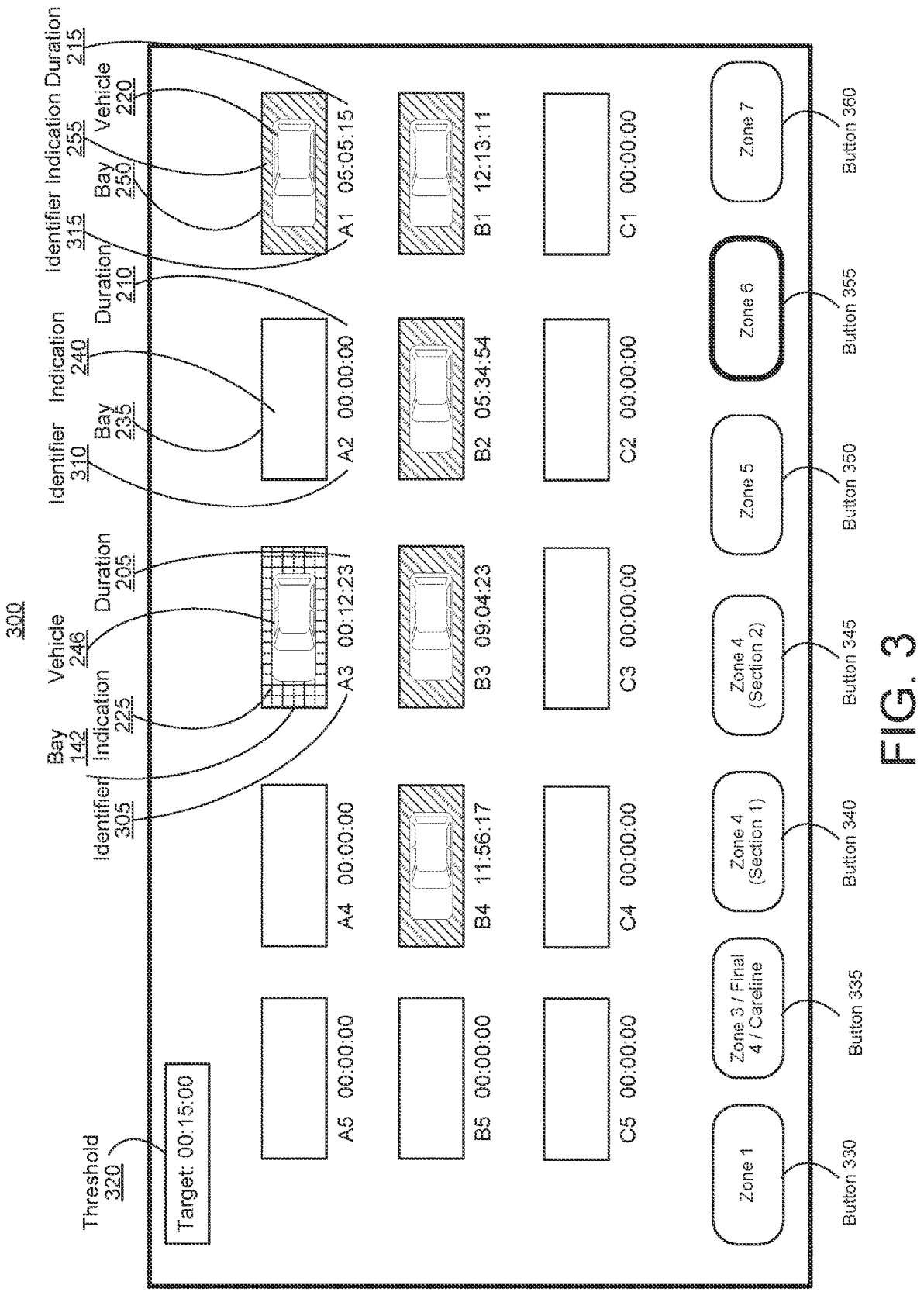
FIG. 3 depicts an example graphical user interface of vehicles in a bay.

FIG. 3 depicts an example graphical user interface 300 of vehicles in bays. The GUI 300 can include one or more component or element depicted in GUI 200 of FIG. 2. The graphical user interface 300 can be provided by the data processing system 102 (e.g., via interface 104). The graphical user interface 300 can display bays within a facility. The graphical user interface 300 can track the duration of vehicles and personnel activity. The graphical user interface 300 can indicate the status of each bay. Each bay can have an identifier (305, 310, 315) that can provide reference for users monitoring the bay's usage. Additional zones can be depicted and can represent different areas or phases within the facility (e.g., "Zone 3/Final 4/Careline" or "Zone 5"). The graphical user interface can include buttons 330, 335, 340, 345, 350, 355, and 360 that can display different zones. A threshold 320 can be set as a metric for comparison. If a vehicle's duration within a bay reaches a threshold, the GUI may trigger an alert or indication For example, the duration 215 for vehicle 220 can have its own indication 255 change color if the threshold 320 is exceeded. The indications 225, 240, and 255 can have different colors or visual displays for different events that can occur (e.g., idle, maintenance, welding).

Figure 4:
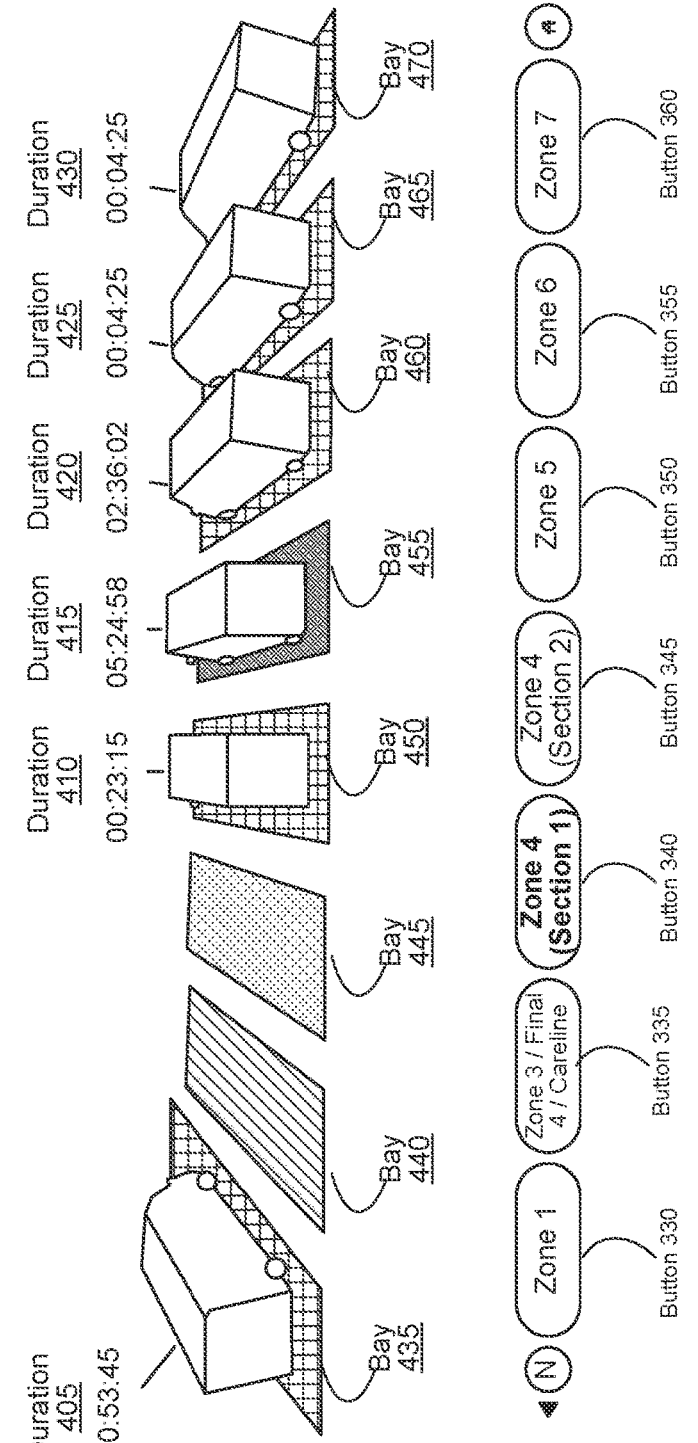
FIG. 4 depicts an example graphical user interface of vehicles in a bay.

FIG. 4 depicts an example graphical user interface 400 of vehicles in bays. The GUI 400 can include one or more component or element depicted in GUI 200 or GUI 300, of FIG. 2 and FIG. 3, respectively. The graphical user interface 400 can be provided by the data processing system 102 (e.g., via interface 104). The graphical user interface 400 can display bays within a facility. The graphical user interface 400 can be a three-dimensional representation of vehicles in a facility. The graphical user interface 400 can be used for monitoring the progress and time management of different zones within a facility that handles vehicles or other objects. A threshold 420 can indicate a target, desired, or maximum allowed time for a vehicle or object to be in a particular zone or to complete a process within the facility. The graphical user interface 400 can display durations 405, 410, 415, 420, 425, and 430. The durations 405, 410, 415, 420, 425, and 430 can be idle, maintenance, inspecting, or welding times. The graphical user interface 400 can display bays 435, 440, 445, 450, 455, 460, 465, and 470 that can be vacant or occupied. Additional zones can be depicted and can represent different areas or phases within the facility (e.g., "Zone 3/Final 4/Careline" or "Zone 5"). The graphical user interface can include buttons 330, 335, 340, 345, 350, 355, and 360 that can display different zones.

Figure 5:
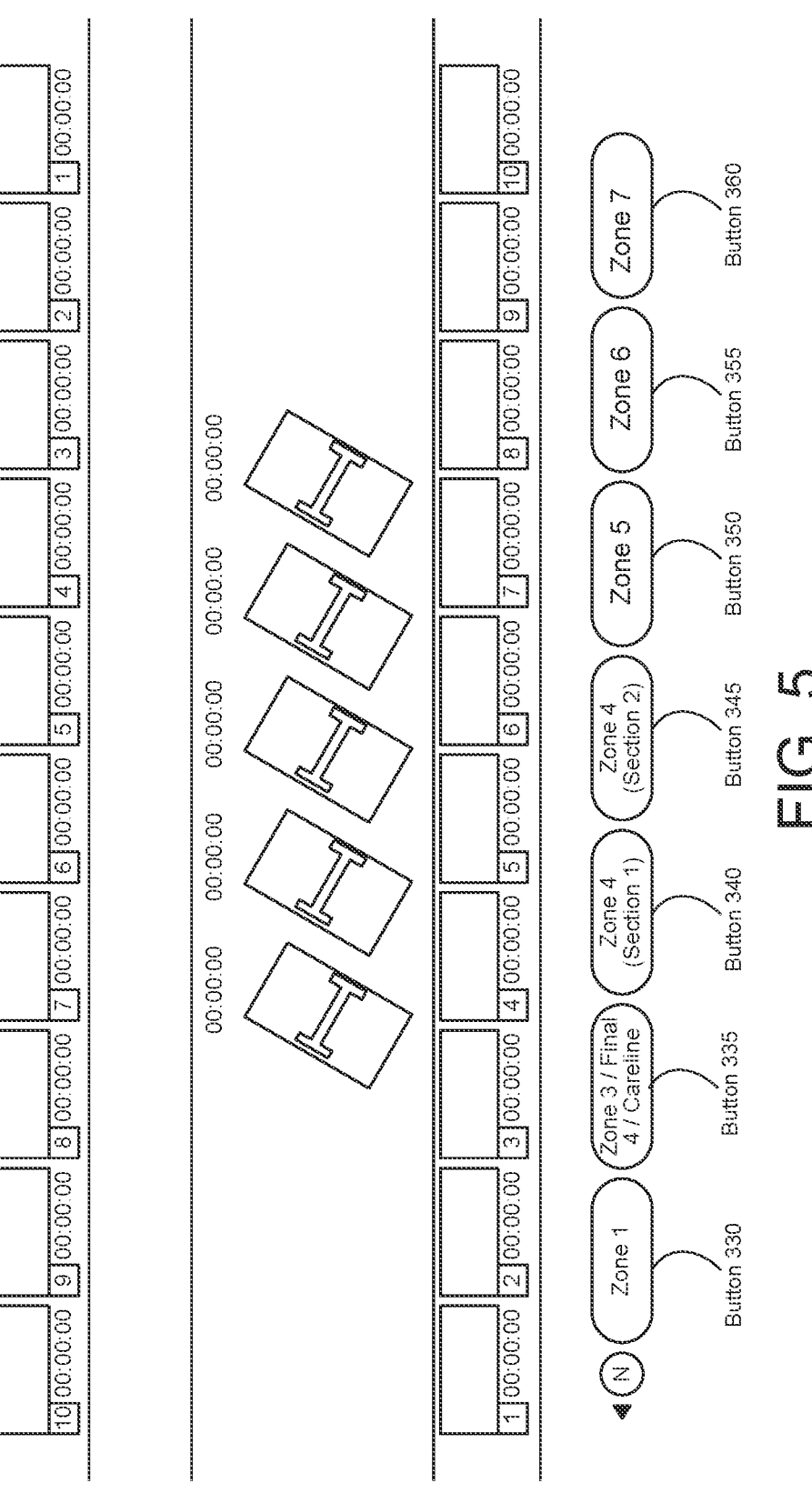
FIG. 5 depicts an example graphical user interface for machine learning based cycle time tracking and reporting for vehicles.

FIG. 5 depicts an example graphical user interface 500 for machine learning based cycle time tracking and reporting for vehicles. The GUI 500 can include one or more component or element depicted in GUI 200, GUI 300, or GUI 400. The graphical user interface 500 can be provided by the data processing system 102 (e.g., via interface 104). The graphical user interface 500 can display bays within a facility. The graphical user interface 500 can be used for monitoring the progress and time management of different zones within a facility that handles vehicles, entities 146, or other objects. The graphical user interface 500 can include multiple thresholds. A threshold 520 can indicate a target, desired, or maximum allowed time for a vehicle or object to be in a particular zone or to complete a process within the facility. A threshold 525 can indicate a target, desired, or maximum allowed time for a vehicle or object to be in a particular zone or to complete a process within the facility. The threshold 520 and threshold 525 can be the same or different. Additional zones can be depicted and can represent different areas or phases within the facility (e.g., "Zone 3/Final 4/Careline" or "Zone 5"). The graphical user interface can include buttons 330, 335, 340, 345, 350, 355, and 360 that can display different zones.

Figure 6:
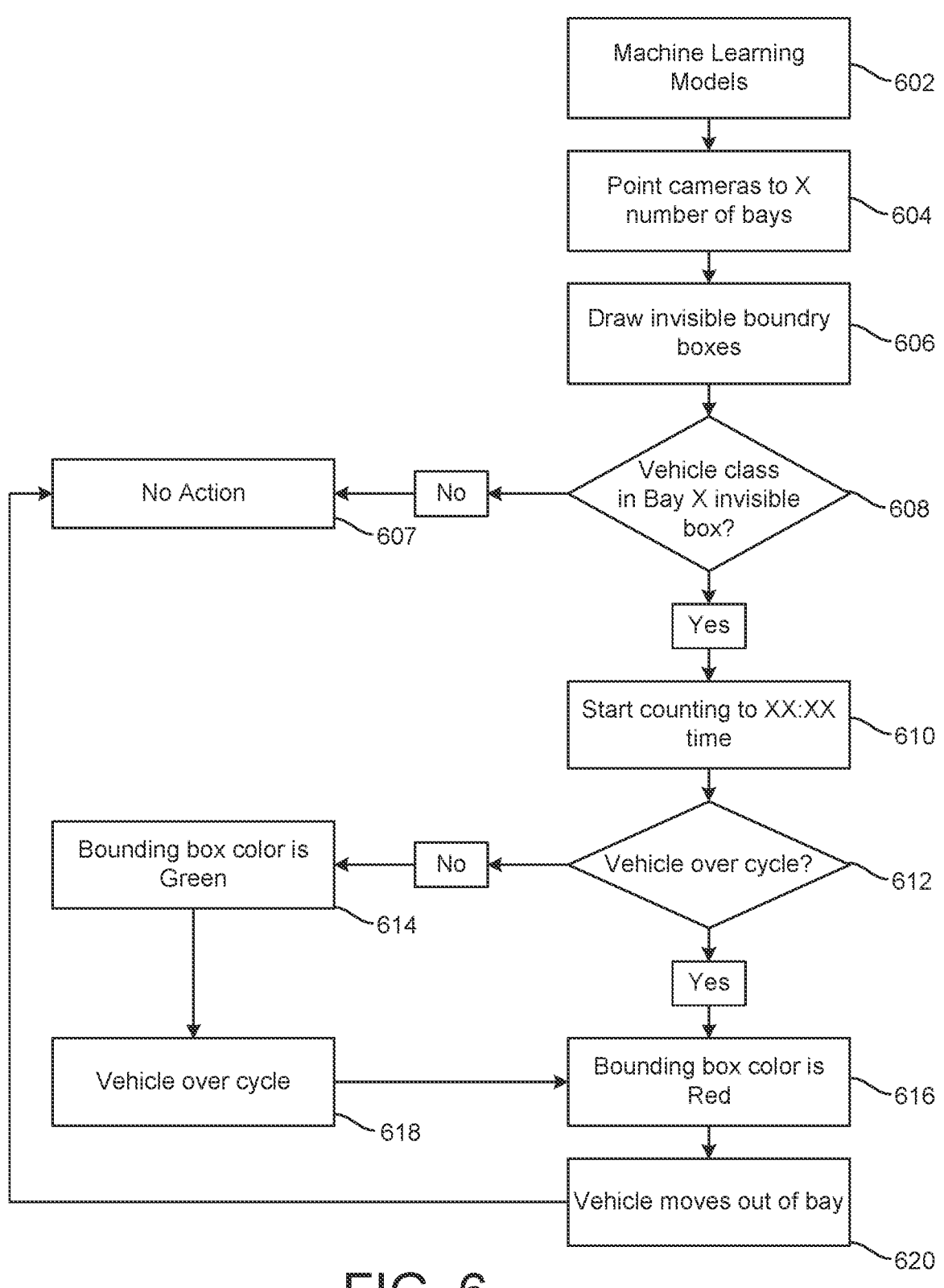
FIG. 6 depicts an example flowchart representation for machine learning based cycle time tracking and reporting for vehicles.

FIG. 6 depicts an example method 600 for machine learning based cycle time tracking and reporting for vehicles. The method 600 can be performed by one or more system or component depicted herein, including, for example, the data processing system 102 depicted in FIG. 1. The method 600 can include the logic sequence employed by the data processing system 102 for vehicle cycle time tracking within a bay environment. At ACT 602, the data processing system can identify or initialize machine learning models (e.g. models 122). At ACT 604, the data processing system can direct cameras 140 to monitor a predetermined number of bays 142. At ACT 606, the data processing system 102 can establish indications (e.g. visible or invisible boundary boxes) within the field of view for each bay 142. At ACT 608, the data processing system can identify the presence of a vehicle class 608 (or entities 146) within these zones. When no vehicle or entity 146 is detected by the data processing system, the data processing system can determine to not take any action at ACT 607. When a vehicle enters the bay 142 and is detected by the data processing system within the confines of the boundary box, the data processing system can trigger the start of a timer, counter, or countdown to a specified time (e.g., XX: XX time) at ACT 610, which can mark or otherwise indicate the beginning of the vehicle's cycle within the bay. At ACT 612, as the vehicle remains within the bay 142, the data processing system can evaluate (e.g., continuously, periodically, or based on some other time interval or responsive to a trigger or condition) whether the vehicle has exceeded the allotted cycle time. The evaluation can be visually represented by the color state of the bounding box. For example, if the vehicle is within the cycle time, the bounding box can retain a green color (ACT 614). When the vehicle overstays beyond the cycle threshold, the bounding box can change its color to red (ACT 616). The bounding box can signal that the vehicle has exceeded the designated cycle time. The data processing system 102 can consider the vehicle as being beyond, exceeding or over cycle at ACT 618. At ACT 620, the data processing system 102 can cease the cycle time tracking for the vehicle responsive to the vehicle exiting or leaving the bay.

Figure 7:
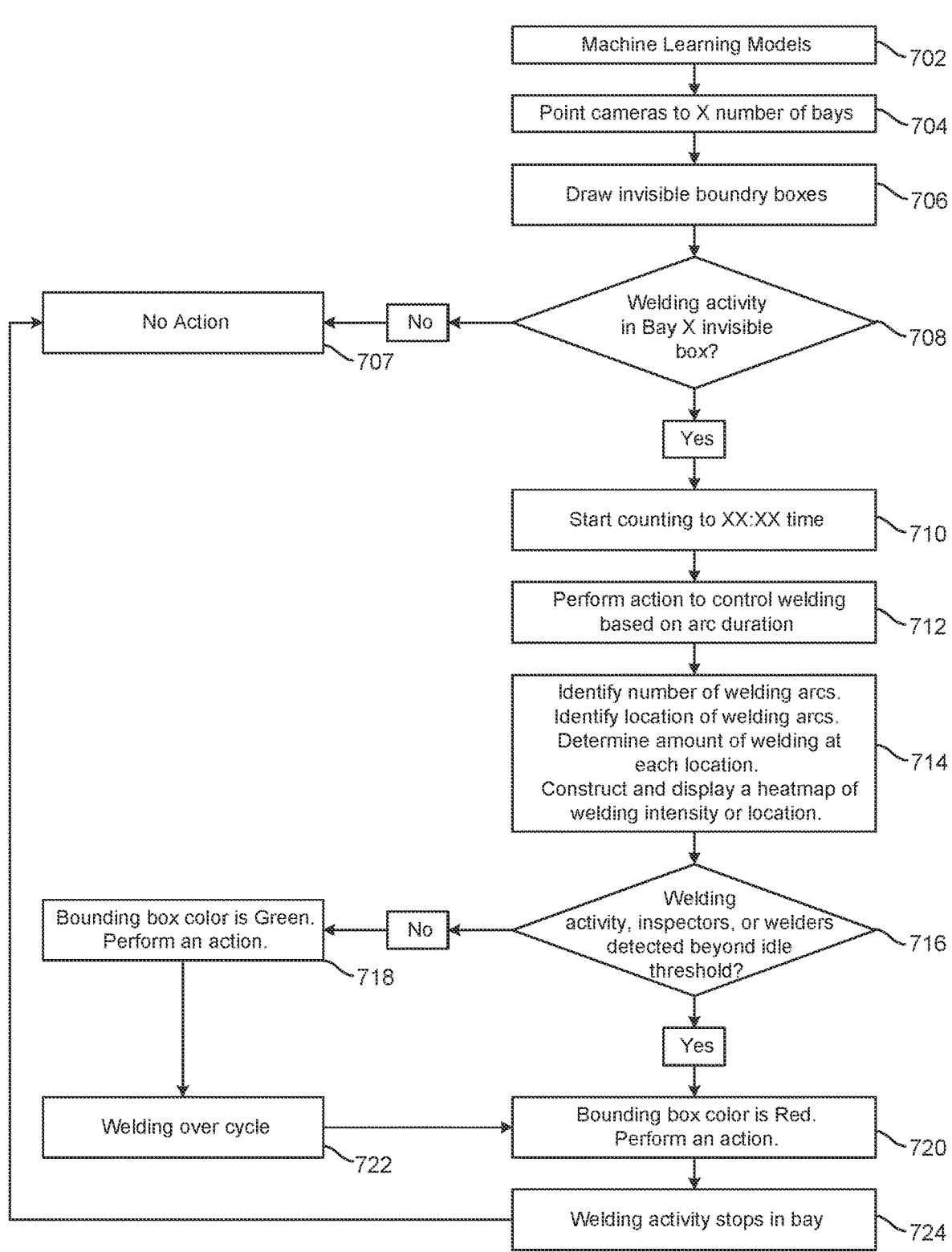
FIG. 7 depicts an example flowchart representation for machine learning based cycle time tracking and reporting for welding.

FIG. 7 depicts an example method 700 for machine learning based cycle time tracking and reporting for welding. The method 700 can be performed by one or more system or component depicted herein, including, for example, the data processing system 102 depicted in FIG. 1. The method 700 can include the logic sequence employed by the data processing system 102 for welding cycle time tracking within a bay environment. At ACT 702, the method 700 can include the data processing system identifying or initializing machine learning models (e.g. models 122). At ACT 704, the data processing system can direct cameras 140 to monitor a predetermined number of bays 142. At ACT 708, data processing system can establish indications 706 (e.g. visible or invisible boundary boxes) within the field of view for each bay 142, which can identify the presence of welding activity (or entities 146) within these zones. When the data processing system does not detect any welding activity is detected, the data processing system may not take any action, as depicted at ACT 707. When an identified entity 146 matches a predetermined type, the data processing system, at ACT 708, can input a series of frames into the models to detect a welding arc. Responsive to the data processing system detecting a welding arc at ACT 708, the data processing system can initiate, at ACT 710, a timer or counter to determine the duration the component remains in the predetermined area following the detection of the welding arc at ACT 708. Thus, the data processing system can detect, responsive to the type of the component matching a predetermined type and an analysis of a plurality of frames of the video stream with the one or more models, a welding arc and a duration the component is disposed in the predetermined area subsequent to detection of the welding arc.

Based on the duration, the data processing system 102 can perform an action to control the welding process at ACT 712. The data processing system 102 can identify the welding arc's location and provide a display of the information on a graphical user interface via the interface 104 (ACT 714). At ACT 714, the data processing system 102 can identify multiple welding arcs, determine the amount of welding at each location, and construct a heatmap to visually represent this data on the GUI. The data processing system 102 can identify welders and inspectors within a certain distance of the welding arc (e.g., ACTS 714 and 716), determine the duration of their presence (ACT 716), and select actions to control the welding process based on these durations. The data processing system 102 can analyze the welding data and transform it into a heatmap display. The data processing system 102 can identify the presence of personnel (e.g., welders, inspectors, operators) and trigger pre-determined actions if their duration within the area falls below or exceeds a threshold. For example, and at ACT 720, if a welder is detected in the bay 142 for an extended period, it can trigger a warning for equipment adjustment. The actions can maintain workflow 130 efficiency and can trigger alerts to the facility manager, initiating automated system diagnostics, or entering a power-saving mode to conserve energy when the bay 142 is not actively used for welding. When no welding arcs, inspectors, or welders are detected by the data processing system within the distance threshold for longer than an idle time threshold, the data processing system can perform an action to control the welding process at ACT 718. The data processing system 102 can continuously evaluate whether the welding activity has exceeded the allotted cycle time. The evaluation can be visually represented by the color state of the bounding box: if the welding activity is within the cycle time, the bounding box can retain a green color (ACT 718). When the welding activity is beyond the cycle threshold, the bounding box can change its color to red (ACT 720). The bounding box can signal that the welding activity has exceeded the designated cycle time. At ACT 722, the data processing system 102 can consider the welding activity as being over cycle if the welding activity as exceeded a threshold or designated cycle time. When the welding activity stops at ACT 724, data processing system 102 can cease, stop, terminate or otherwise end the cycle time tracking for the welding activity.

Figure 8:
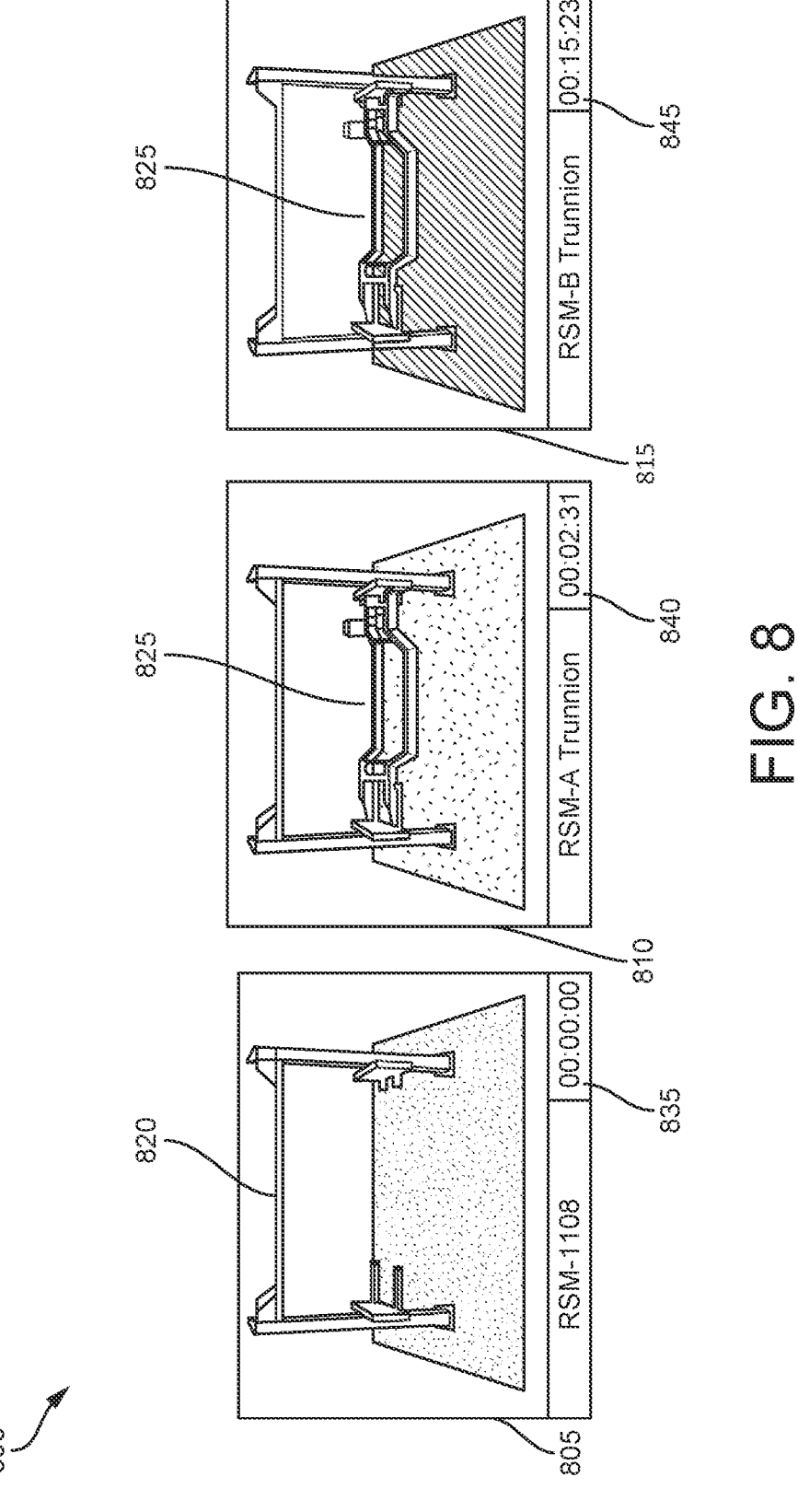
FIG. 8 depicts an example graphical user interface of welding stations.

FIG. 8 depicts an example graphical user interface 800 of welding stations. The GUI 800 can include one or more component or element depicted in FIG. 1, FIG. 2, FIG. 3, FIG. 4, FIG. 5, FIG. 6, and FIG. 7. The welding stations can be in bays 142. The welding stations 805, 810, and 815 can be at different bays 142. The welding station 805 can be empty and not in use. A time stamp 835 (e.g., duration) for the vacant welding station 805 can be zero. The vacant welding station 805 can have a grey coloring. The vacant welding station 805 can have an apparatus 820 to secure a mechanical component. The apparatus 820 can be a welding jig, assembly fixture, support frame, clamping station, or welding station frame. The apparatus 820 can be used to hold components in place during welding, assemble parts before they are welded, and provide structural support for components during welding. The apparatus 820 can be used to secure mechanical component 825 that is being welded. The mechanical component 825 can be a vehicle axle, drivetrain assembly, a part of a vehicle undercarriage, shaft, gear, and part of the suspension system, or chassis. The welding station 810 can be in-use and can include the mechanical component 825. The in-use welding station 825 can have a duration 840. The welding station 815 can be in-use and can include the mechanical component 825. The in-use welding station 815 can have a duration 845. If the durations 840 or 845 do not exceed a threshold, the welding station 810 or 815 can have a green coloring. If the durations 840 or 845 exceed a threshold, the welding station 810 or 815 can have a red coloring. The threshold can depend on the workflow 130 of a welding workstation (e.g., assembling, inspecting, or repairing).

Figure 9:
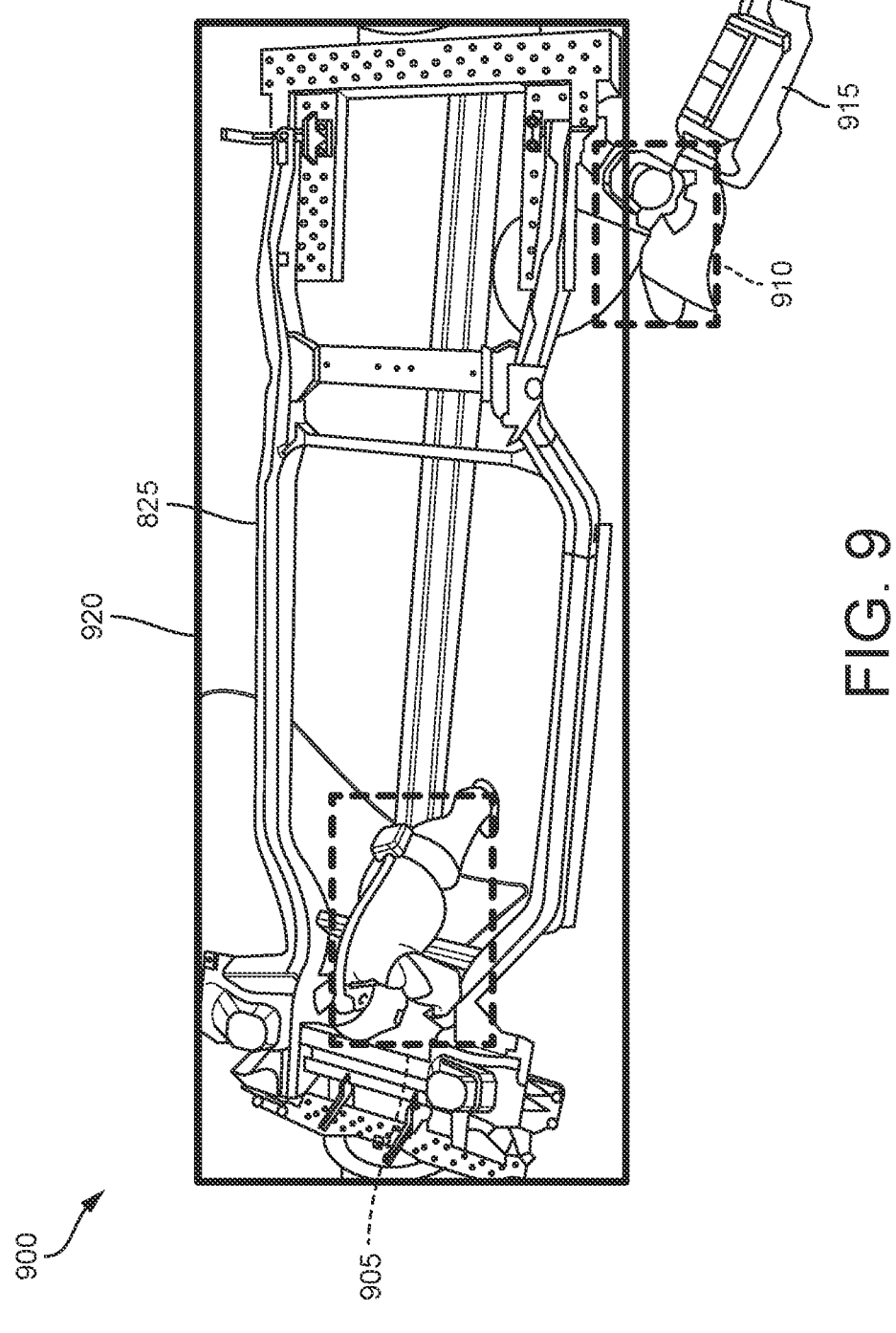
FIG. 9 depicts an example graphical user interface of welding stations.

FIG. 9 depicts an example graphical user interface 900 of a welding stations. The GUI 800 can include one or more component or element depicted in FIG. 1, FIG. 2, FIG. 3, FIG. 4, FIG. 5, FIG. 6, FIG. 7, and FIG. 8. The welding stations can be in the bay 142. The graphical user interface 900 can include a video stream from the cameras 140. The graphical user interface 900 can include apparatus 820. The graphical user interface 900 can include bounding box 905 and 910. Bounding boxes 905, 910, and 920 can include entities 146 (e.g., personnel) or bays 142. The bounding boxes 905 and 910 can have different colors for different personnel type (e.g., welders, inspectors, operators). The graphical user interface 900 can ignore placing bounding boxes 905 and 910 around objects 915 in the video stream from the cameras 140. The objects 915 can be determined by the machine learning models or data processing system 102 to be irrelevant.

Figure 10:
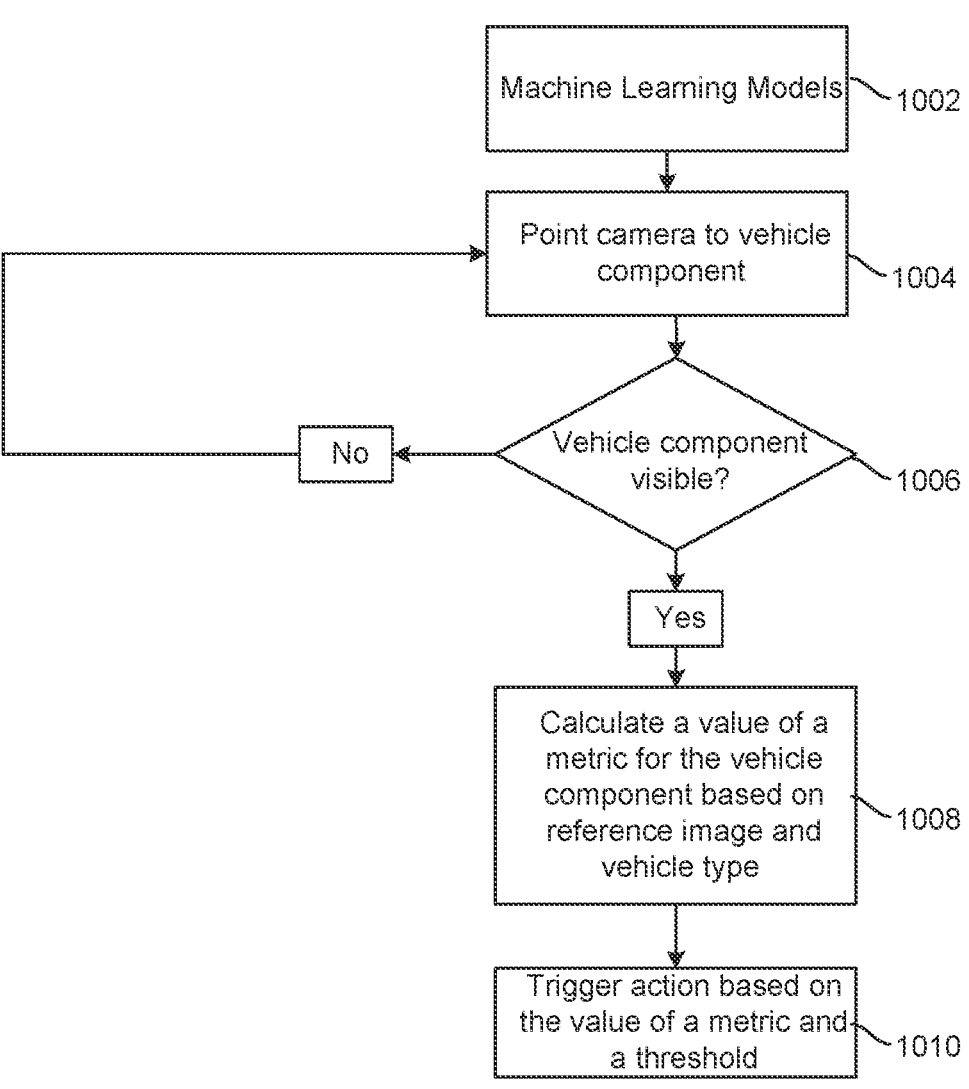
FIG. 10 depicts an example flowchart representing a process for inspecting vehicle components using machine learning models.

FIG. 10 provides a flowchart 1000 depicting a process for inspecting vehicle components using machine learning models. FIG. 10 can include one or more component or element depicted in FIG. 1, FIG. 2, FIG. 3, FIG. 4, FIG. 5, FIG. 6, FIG. 7, FIG. 8, and FIG. 9. The flowchart representation can be for the system 100, outlining the logic sequence employed by the data processing system 102 for inspecting vehicle components. The process starts with the initialization of machine learning models 1002 (e.g. models 122). The system 100 can direct the cameras 140 (1004) to monitor a predetermined number of bays 142. When no vehicle component is visible, the camera can point to different location to identify a vehicle component. Once the vehicle component is confirmed to be visible 1006, machine learning models can calculate a value for a metric for the vehicle component 1008. The calculation can be based on the reference image and the type of vehicle 1008. The machine learning model can compare the captured image with a pre-existing reference standard (e.g., reference image) 1008. Each type of vehicle component or vehicle can have a threshold (e.g., tolerance threshold). The data processing system 102 can determine and execute an action based on the metric and the tolerance threshold 1010. For example, when the value of the metric satisfies (e.g., is less than or equal to) the tolerance threshold, the action can be to cause a re-assembly of the component on the vehicle or the action can be to block delivery of the vehicle. When the value of the metric does not satisfy (e.g., is greater than or equal to) the tolerance threshold, the action can be to authorize delivery of the vehicle. The action can be to control a manufacturing operation of the vehicle based on a comparison of the value for the metric with the tolerance threshold. The action can depend on the type of vehicle or the type of component of the vehicle. Different entities 146 can have different tolerance thresholds. The manufacturing operation can include, for example, to install or reinstall a part or component. The manufacturing operation can include to provide a notification or other indication that installation is satisfactory and that the vehicle can proceed to a next stage. The action to control the manufacturing operation can include, for example, a command, indication, instructions, or notification.

Figure 11:
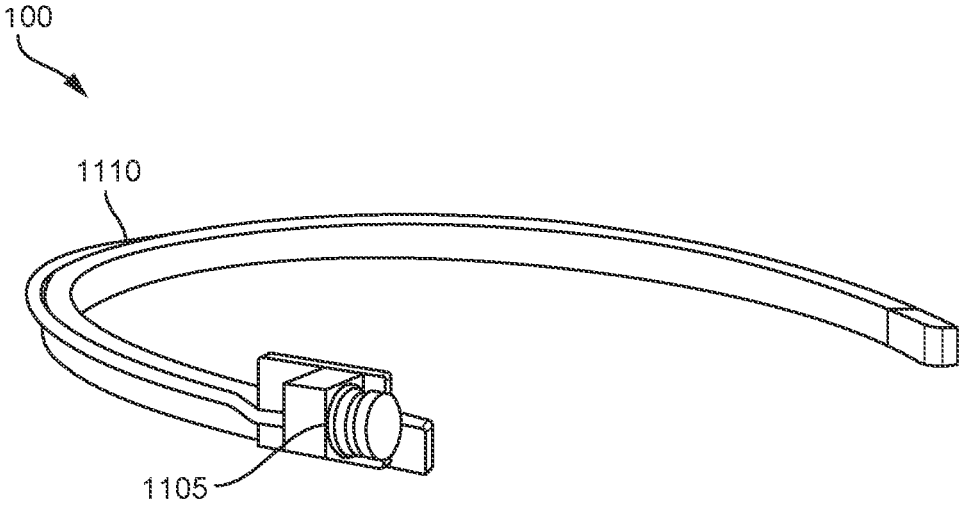
FIG. 11 depicts an example head mount for inspecting vehicle components.

FIG. 11 depicts an example of a head mount for inspecting vehicle components. The example head mount can be part of a machine-learning powered vision system. FIG. 11 can include one or more component or element depicted in FIG. 1, FIG. 2, FIG. 3, FIG. 4, FIG. 5, FIG. 6, FIG. 7, FIG. 8, FIG. 9, and FIG. 10. The head mount 1100 can include a camera 1105. The head mount 1100 can include a battery electrically coupled with the camera 1105 to deliver power to the camera 1105. The head mount 1100 can allow for mobility and ease of use in a manufacturing or inspection environment. The head mount 1100 can allow personnel to move freely around the vehicle while conducting quality control assessments, inspections, maintenance, or welding. The camera 1105 can transmit data in real-time to the data processing system 102 where the machine learning models run. The camera 1105 can provide illumination. The head mount 1100 can include a support 1110. The supports 1110 can be semi-circular. The supports 1110 can ensure the head mount 1100 remains securely in place even when the personnel leans over or moves rapidly.

Figure 12:
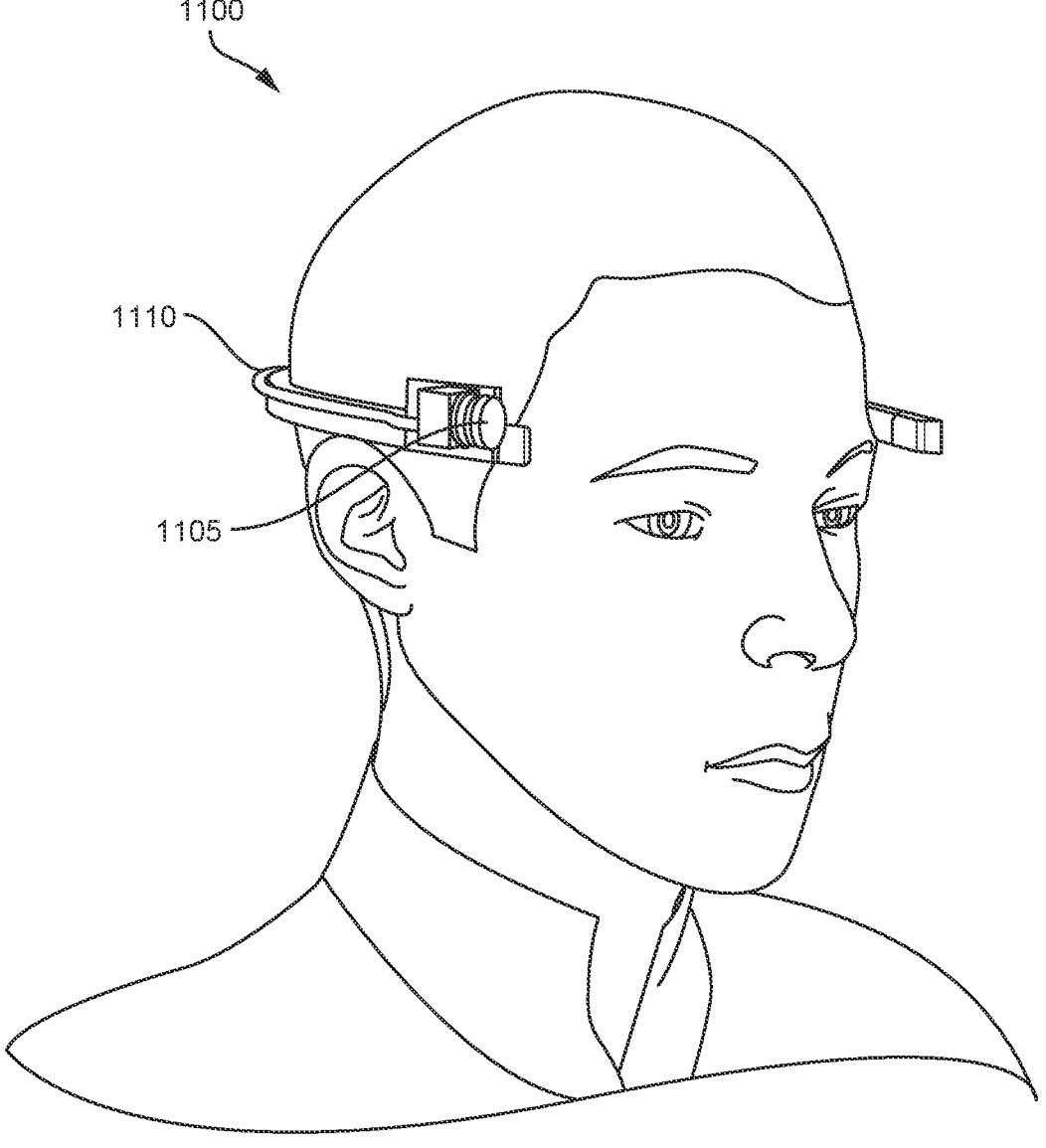
FIG. 12 depicts an example head mount for inspecting vehicle components.

FIG. 12 depicts an example of a head mount for inspecting vehicle components. The example head mount can be part of a machine-learning powered vision system. FIG. 12 can include one or more component or element depicted in FIG. 1, FIG. 2, FIG. 3, FIG. 4, FIG. 5, FIG. 6, FIG. 7, FIG. 8, FIG. 9, FIG. 10 and FIG. 11. FIG. 12 can represent the head mount 1100 worn by a personnel.

Figure 13:
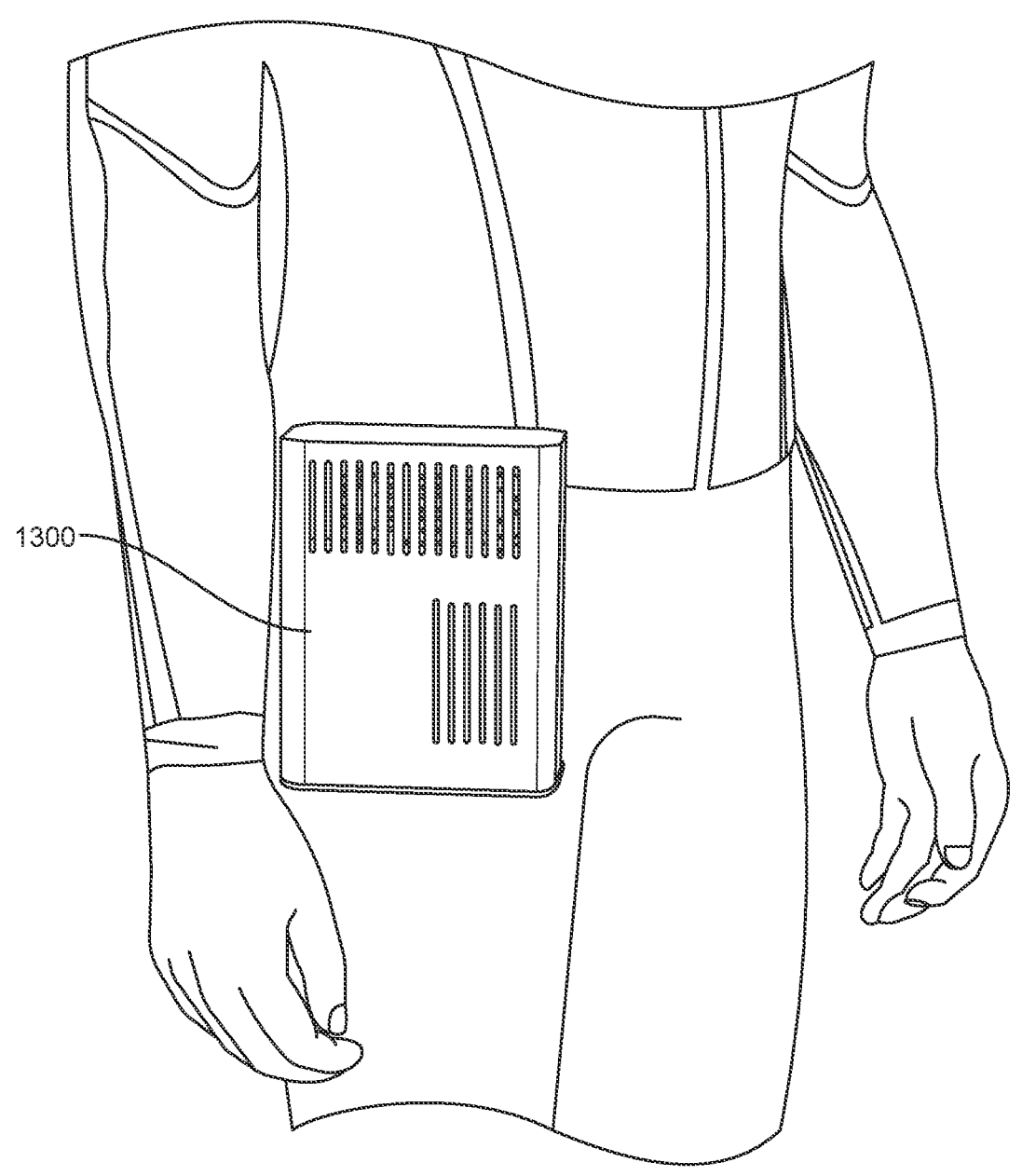
FIG. 13 depicts an example of a module for the head mount.

FIG. 13 depicts an example of a module for the head mount. The example head mount can be part of a machine-learning powered vision system. FIG. 13 can include one or more component or element depicted in FIG. 1, FIG. 2, FIG. 3, FIG. 4, FIG. 5, FIG. 6, FIG. 7, FIG. 8, FIG. 9, FIG. 10, FIG. 11, and FIG. 12. A module 1300 can house the battery for the head mount 1100 worn by a personnel. The module 1300 can be placed or mounted on a vest, pants, or belt of a personnel. The module 1300 can include wired or wireless connectivity for power management and communication with the head mount 1100 and other systems.

Figure 14:
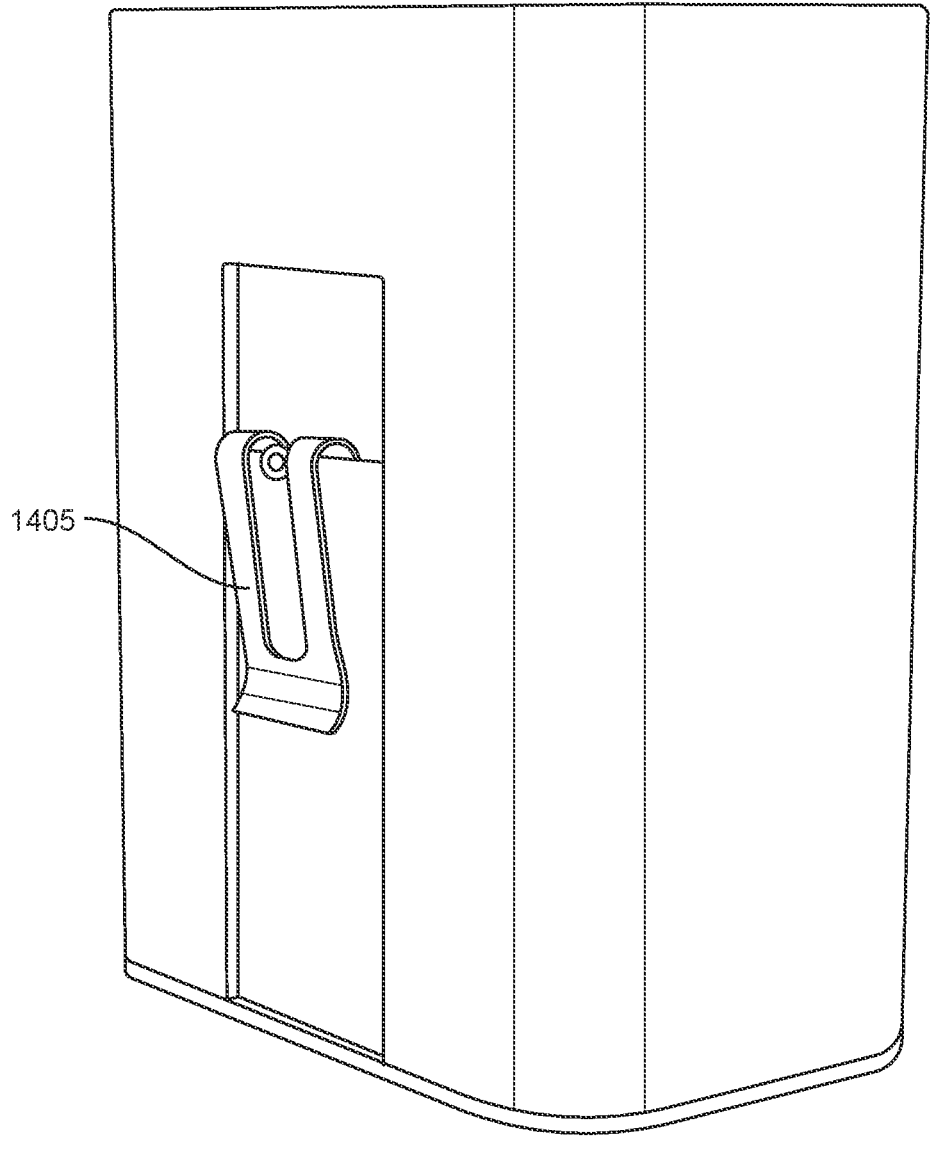
FIG. 14 depicts an example of a module for the head mount.

FIG. 14 depicts an example of a module for the head mount. The example head mount can be part of a machine-learning powered vision system. FIG. 14 can include one or more component or element depicted in FIGS. 1-13. FIG. 14 can include a belt clip 1405 to mount the module 1300.

Figure 15:
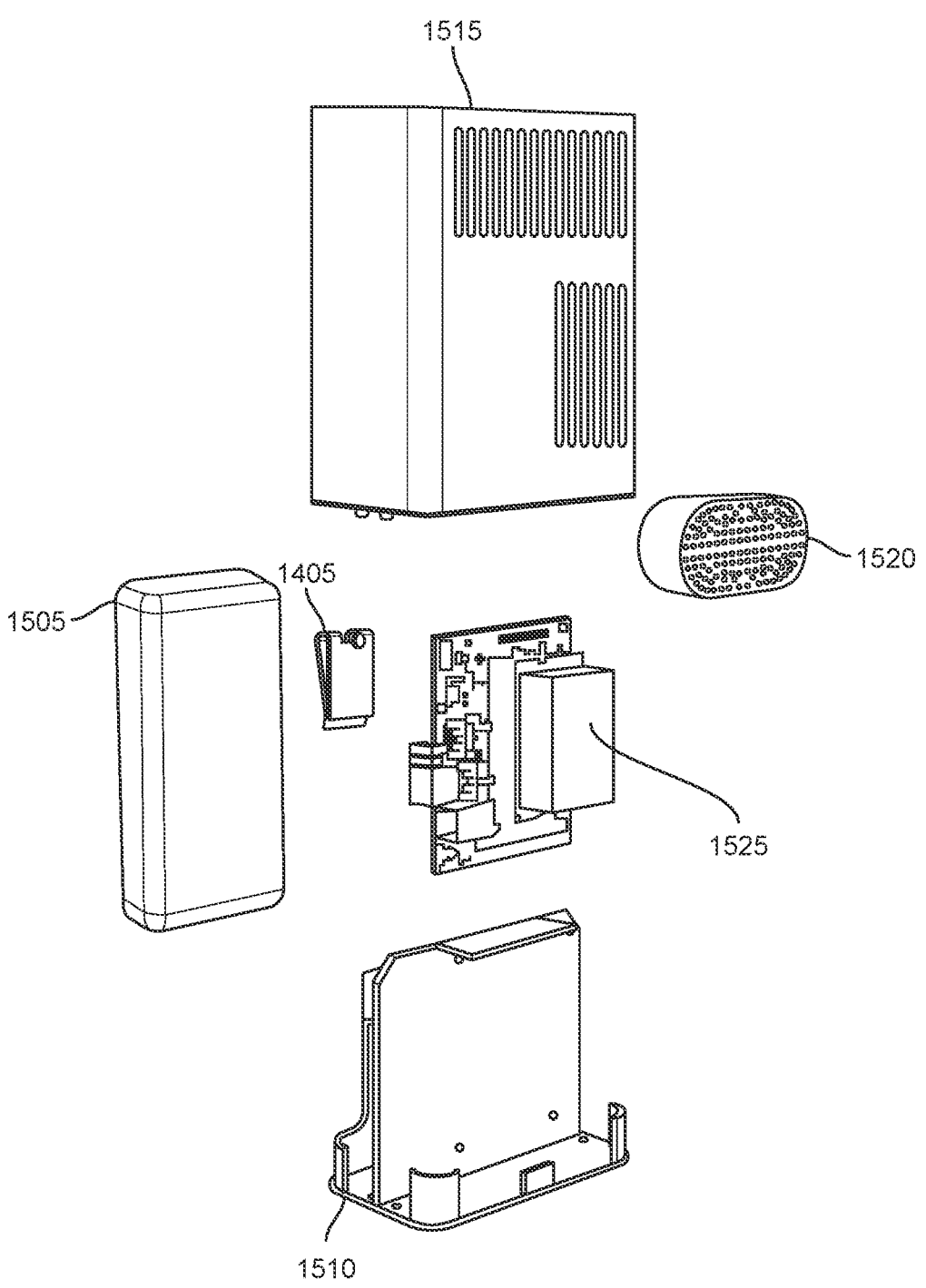
FIG. 15 depicts an example of an exploded view of a module for the head mount.

FIG. 15 depicts an example of an exploded view of a module for the head mount. The example head mount can be part of a machine-learning powered vision system. FIG. 15 can include one or more component or element depicted in FIGS. 1-14. The module 1300 can include a battery 1505. The battery 1505 can be the energy source for the module and provide power to the other components. The module 1300 can include a speaker 1520. The speaker 1520 can include an audio component for providing feedback, alerts, or communications to the user of the head mount 1100. The speaker 1520 can provide an audio output indicative of a performance of the assembly of the type of the component based on the comparison of the value for the metric with the tolerance threshold. The speaker 1520 can provide an action. The module 1300 can include a computer system 1525 or a data processing system 1525. The data processing system 1525 can perform one or more functionality of the data processing system 102. The data processing system 1525 can include one or more component or element of the data processing system 102. The module 1300 can include a lower case 1510. The lower case 1510 can be three-dimensionally printed. The lower case 1510 can hold the battery 1505 and the computer system 1525. The module 1300 can include an upper case 1515. The upper case 1515 can be three-dimensionally printed. The upper case 1515 can protect internal components of the module 1300. The upper case 1515 can include vents. The upper case 1515 can dissipate heat. through its vents.

Figure 16:
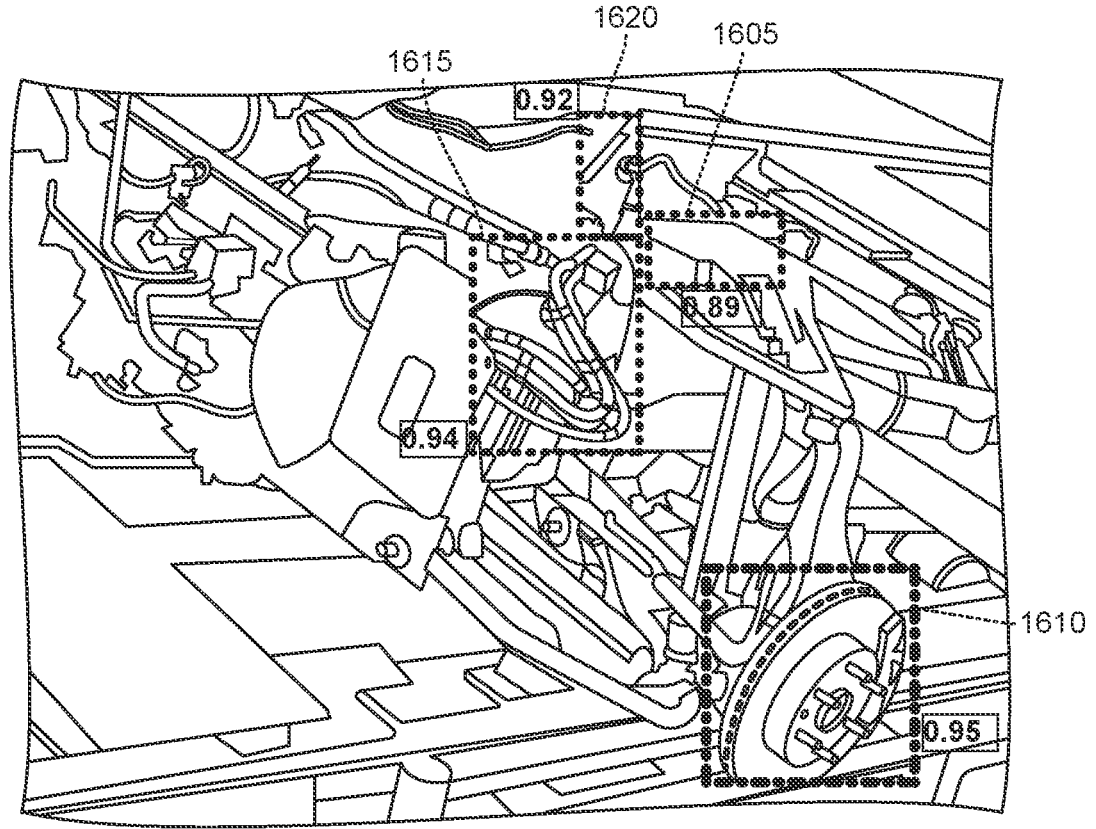
FIG. 16 depicts an example graphical user interface vehicle components under inspection.

FIG. 16 depicts an example graphical user interface (GUI) 1600 of vehicle or vehicle components under inspection.

FIG. 16 can include one or more component or element depicted in FIGS. 1-15. The graphical user interface 1600 can be provided by the data processing system 102 (e.g., via interface 104) or data processing system 1525. The graphical user interface 1600 can display the objects, entities 146, or vehicle components from the head mount 1100. The graphical user interface 1600 can display bounding boxes 1605, 1610, 1615, and 1620 around the objects, entities 146, or vehicle components. The bounding boxes 1605, 1610, 1615, and 1620 can represent different categories or statuses of the component it surrounds. The bounding boxes 1605, 1610, 1615, and 1620 can include confidence scores. The confidence scores can indicate how certain a component within the bounding boxes has been correctly identified and/or installed. The bounding boxes 1605, 1610, 1615, and 1620 can display different colors for different confidence scores. For example, a green box can indicate a correctly installed component, while a blue box can indicate a component that requires further inspection.

Figure 17:
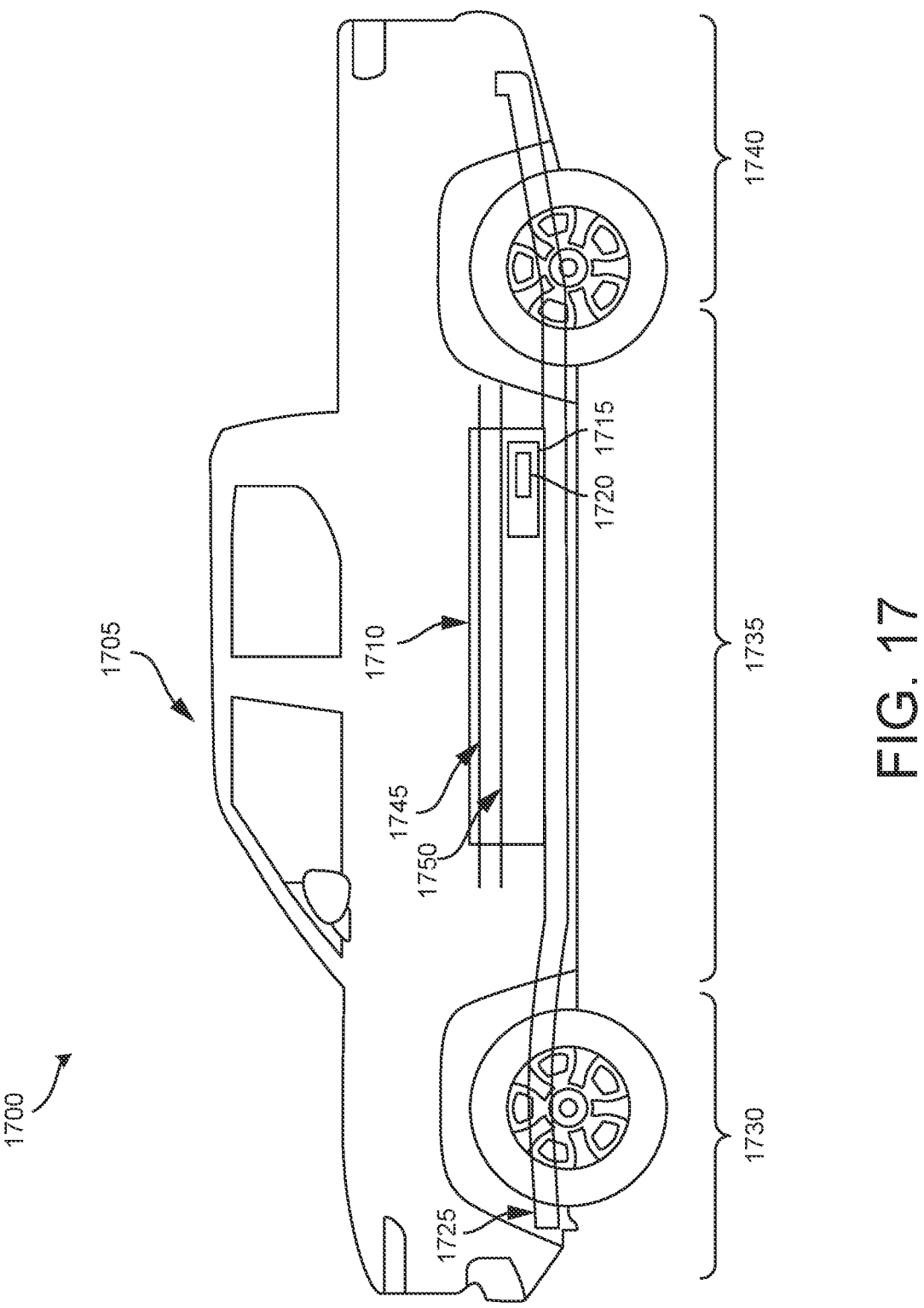
FIG. 17 depicts an example of an electric vehicle.

FIG. 17 depicts an example cross-sectional view 1700 of an electric vehicle 1705 installed with at least one battery pack 1710. Electric vehicles 1705 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 1710 can also be used as an energy storage system to power a building, such as a residential home or commercial building. Electric vehicles 1705 can be fully electric or partially electric (e.g., plug-in hybrid) and further, electric vehicles 1705 can be fully autonomous, partially autonomous, or unmanned. Electric vehicles 1705 can also be human operated or non-autonomous. Electric vehicles 1705 such as electric trucks or automobiles can include on-board battery packs 1710, batteries 1715 or battery modules 1715, or battery cells 1720 to power the electric vehicles. The electric vehicle 1705 can include a chassis 1725 (e.g., a frame, internal frame, or support structure). The chassis 1725 can support various components of the electric vehicle 1705. The chassis 1725 can span a front portion 1730 (e.g., a hood or bonnet portion), a body portion 1735, and a rear portion 1740 (e.g., a trunk, payload, or boot portion) of the electric vehicle 1705. The battery pack 1710 can be installed or placed within the electric vehicle 1705. For example, the battery pack 1710 can be installed on the chassis 1725 of the electric vehicle 1705 within one or more of the front portion 1730, the body portion 1735, or the rear portion 1740. The battery pack 1710 can include or connect with at least one busbar, e.g., a current collector element. For example, the first busbar 1745 and the second busbar 1750 can include electrically conductive material to connect or otherwise electrically couple the battery 1715, the battery modules 1715, or the battery cells 1720 with other electrical components of the electric vehicle 1705 to provide electrical power to various systems or components of the electric vehicle 1705.

Figure 18:
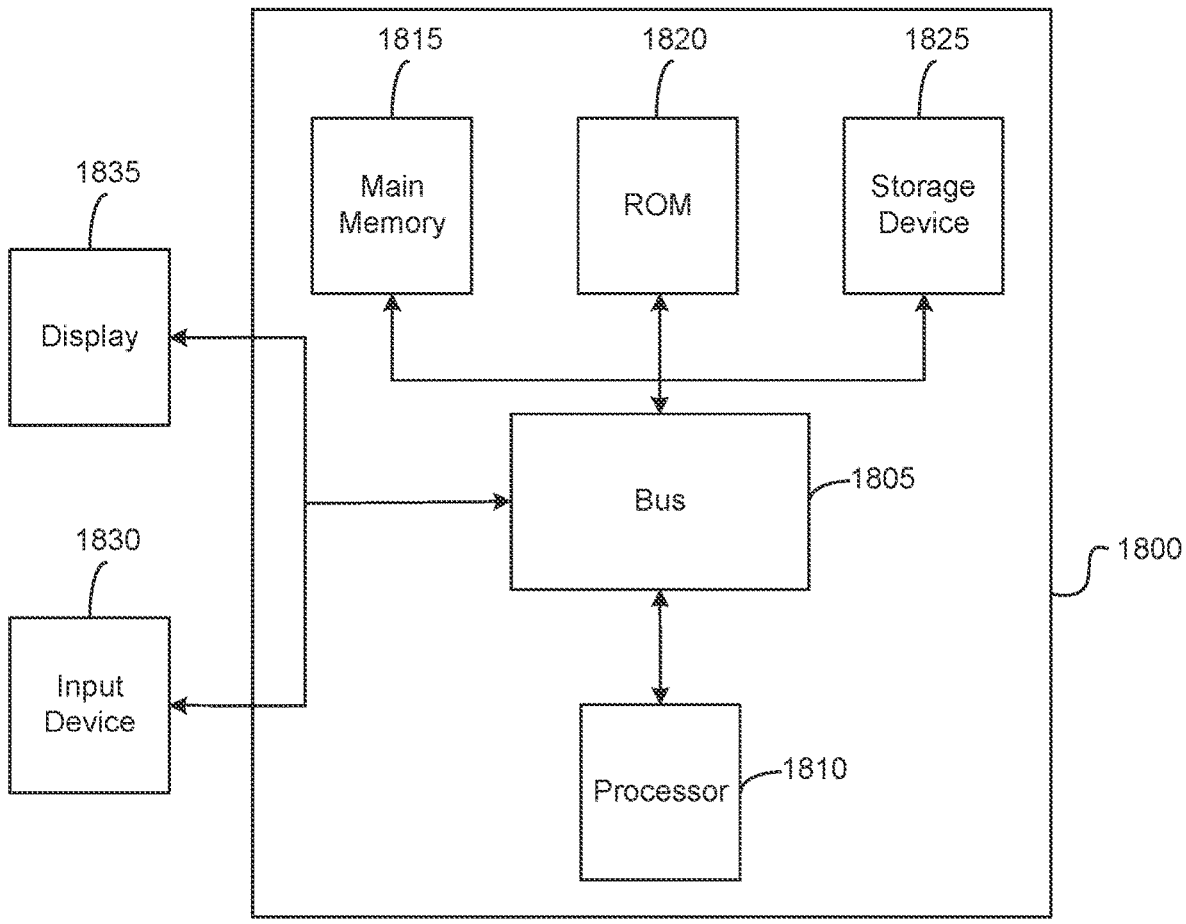
FIG. 18 is a block diagram illustrating an architecture for a computer system that can be employed to implement elements of the systems, methods, graphical user interfaces, and flowcharts described and illustrated herein.

FIG. 18 depicts an example block diagram of an example computer system 1800. The computer system or computing device 1800 can include or be used to implement the data processing system 102 or its components or the data processing system 1525. The computing system 1800 includes at least one bus 1805 or other communication component for communicating information and at least one processor 1810 or processing circuit coupled to the bus 1805 for processing information. The computing system 1800 can also include one or more processors 1810 or processing circuits coupled to the bus for processing information. The computing system 1800 also includes at least one main memory 1815, such as a random-access memory (RAM) or other dynamic storage device, coupled to the bus 1805 for storing information, and instructions to be executed by the processor 1810. The main memory 1815 can be used for storing information during execution of instructions by the processor 1810. The computing system 1800 may further include at least one read only memory (ROM) 1820 or other static storage device coupled to the bus 1805 for storing static information and instructions for the processor 1810. A storage device 1825, such as a solid-state device, magnetic disk or optical disk, can be coupled to the bus 1805 to persistently store information and instructions.

The computing system 1800 may be coupled via the bus 1805 to a display 1835, such as a liquid crystal display, or active-matrix display, for displaying information to a user such as a driver of the electric vehicle 705 or other end user. An input device 1830, such as a keyboard or voice interface may be coupled to the bus 1805 for communicating information and commands to the processor 1810. The input device 1830 can include a touch screen display 1835. The input device 1830 can also include a cursor control, such as a mouse, a trackball, or cursor direction keys, for communicating direction information and command selections to the processor 1810 and for controlling cursor movement on the display 1835.

The processes, systems and methods described herein can be implemented by the computing system 1800 in response to the processor 1810 executing an arrangement of instructions contained in main memory 1815. Such instructions can be read into main memory 1815 from another computer-readable medium, such as the storage device 1825. Execution of the arrangement of instructions contained in main memory 1815 causes the computing system 1800 to perform the illustrative processes described herein. One or more processors in a multi-processing arrangement may also be employed to execute the instructions contained in main memory 1815. Hard-wired circuitry can be used in place of or in combination with software instructions together with the systems and methods described herein. Systems and methods described herein are not limited to any specific combination of hardware circuitry and software.

Although an example computing system has been described in FIG. 18, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture.

The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
one or more processors, coupled with memory, to:
receive, from one or more cameras, a video stream that captures a component for a vehicle, the component disposed in a predetermined area;
determine, via one or more models trained with machine learning and based on the video stream, a type of the component;
detect, responsive to the type of the component matching a predetermined type and an analysis of a plurality of frames of the video stream with the one or more models, a welding arc and a duration the component is disposed in the predetermined area subsequent to detection of the welding arc; and
perform, based on the duration, an action to control a welding process for the component of the vehicle.

2. The system of claim 1, comprising the one or more processors to:
identify, via the one or more models, a location of the welding arc on the component; and
provide, for display via a graphical user interface, an indication of the location of the welding arc on the component and the type of the component.

3. The system of claim 1, comprising the one or more processors to:
identify, via the video stream input into the one or more models, a plurality of locations of welding arcs on the component;
determine an amount of welding performed at each of the plurality of locations;
construct a heatmap that indicates the amount of welding performed at each of the plurality of locations; and
provide the heatmap for display via a graphical user interface.

4. The system of claim 1, comprising the one or more processors to:
identify, via the one or more models, a welder located within a distance threshold of a location of the welding arc;
determine a second duration the welder is located within the distance threshold of the location of the welding arc; and select the action to control the welding process based on the second duration.

5. The system of claim 1, comprising the one or more processors to:
identify, via the one or more models, a count of welding arcs located within a distance threshold of the component; and
provide, for display via a graphical user interface, an indication of the count of welding arcs overlaid on a display of the video stream.

6. The system of claim 1, comprising the one or more processors to:
identify, via the one or more models, a count of welders located within a distance threshold of the component; and
provide, for display via a graphical user interface, an indication of the count of welders overlaid on a display of the video stream.

7. The system of claim 1, comprising the one or more processors to:
identify, via the one or more models, an inspector located within a distance threshold of a location of the welding arc;
determine a second duration the inspector is located within the distance threshold of the location of the welding arc;
determine a quality of the welding process based on the second duration; and
select the action to control the welding process based on the quality.

8. The system of claim 1, comprising the one or more processors to:
train the one or more models trained with machine learning using training data comprising historical image data comprising welding arcs emitted during historic welding processes under varied lighting conditions and manufacturing environments.

9. The system of claim 1, comprising the one or more processors to:
determine, via input of the video stream into the one or more models, a second duration of the welding process that lacks any welding arcs, inspectors, or welders within a distance threshold of the component; and
perform, based on the second duration greater than an idle time threshold, an action to control the welding process for the component of the vehicle.

10. The system of claim 1, comprising the one or more processors to:
generate a value of a performance metric for the welding process based on the duration; and
select the action to perform to improve the value of the performance metric.

11. A method, comprising:
receiving, by one or more processors coupled with memory, from one or more cameras, a video stream that captures a component for a vehicle, the component disposed in a predetermined area;
determining, by the one or more processors via one or more models trained with machine learning and based on the video stream, a type of the component;
detecting, by the one or more processors, responsive to the type of the component matching a predetermined type and an analysis of a plurality of frames of the video stream with the one or more models, a welding arc and a duration the component is disposed in the predetermined area subsequent to detection of the welding arc; and performing, by the one or more processors based on the duration, an action to control a welding process for the component of the vehicle.

12. The method of claim 11, comprising:
identifying, by the one or more processors via the one or more models, a location of the welding arc on the component; and
providing, by the one or more processors for display via a graphical user interface, an indication of the location of the welding arc on the component and the type of the component.

13. The method of claim 11, comprising:
identifying, by the one or more processors via the video stream input into the one or more models, a plurality of locations of welding arcs on the component;
determining, by the one or more processors, an amount of welding performed at each of the plurality of locations;
constructing, by the one or more processors, a heatmap that indicates the amount of welding performed at each of the plurality of locations; and
providing, by the one or more processors, the heatmap for display via a graphical user interface.

14. The method of claim 11, comprising:
identifying, by the one or more processors via the one or more models, a welder located within a distance threshold of a location of the welding arc;
determining, by the one or more processors, a second duration the welder is located within the distance threshold of the location of the welding arc; and
selecting, by the one or more processors, the action to control the welding process based on the second duration.

15. The method of claim 11, comprising:
identifying, by the one or more processors via the one or more models, a count of welding arcs located within a distance threshold of the component; and
providing, by the one or more processors for display via a graphical user interface, an indication of the count of welding arcs overlaid on a display of the video stream.

16. The method of claim 11, comprising:
identifying, by the one or more processors via the one or more models, a count of welders located within a distance threshold of the component; and
providing, by the one or more processors for display via a graphical user interface, an indication of the count of welders overlaid on a display of the video stream.

17. The method of claim 11, comprising:
identifying, by the one or more processors via the one or more models, an inspector located within a distance threshold of a location of the welding arc;
determining, by the one or more processors, a second duration the inspector is located within the distance threshold of the location of the welding arc;
determining, by the one or more processors, a quality of the welding process based on the second duration; and
selecting, by the one or more processors, the action to control the welding process based on the quality.

18. The method of claim 11, comprising:
training, by the one or more processors, the one or more models trained with machine learning using training data comprising historical image data comprising welding arcs emitted during historic welding processes under varied lighting conditions and manufacturing environments.

19. The method of claim 11, comprising:
determining, by the one or more processors via input of the video stream into the one or more models, a second duration of the welding process that lacks any welding arcs, inspectors, or welders within a distance threshold of the component; and
performing, by the one or more processors, based on the second duration greater than an idle time threshold, an action to control the welding process for the component of the vehicle.

20. A vehicle manufacturing system, comprising:
markings surrounding a welding area in a manufacturing facility;
a camera oriented to capture image data from the welding area; and
one or more processors, coupled with memory, to:
receive, from the camera, a video stream that captures a component for a vehicle, the component disposed in the welding area;
determine, via one or more models trained with machine learning and based on the video stream, a type of the component;
detect, responsive to the type of the component matching a predetermined type and an analysis of a plurality of frames of the video stream with the one or more models, a welding arc and a duration the component is disposed in the predetermined area subsequent to detection of the welding arc; and
perform, based on the duration, an action to control a welding process for the component of the vehicle.

* * * * *